(12) United States Patent
Potkonjak

(10) Patent No.: US 8,369,242 B2
(45) Date of Patent: *Feb. 5, 2013

(54) EFFICIENT LOCATION DISCOVERY

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 508 days.

This patent is subject to a terminal disclaimer.

(21) Appl. No.: 12/415,518

(22) Filed: Mar. 31, 2009

(65) Prior Publication Data

US 2010/0246405 A1 Sep. 30, 2010

(51) Int. Cl.
*H04L 12/28* (2006.01)

(52) U.S. Cl. ........ 370/254; 370/255; 370/328; 370/338; 455/404.2; 455/456.1; 340/686.1; 340/686.6

(58) Field of Classification Search .......... 370/241–256, 370/310–328, 338–341; 709/220–223, 229–244; 455/456.1, 41.2, 404.2, 423–424, 456.2, 455/456.3, 457; 340/686, 691.1, 691.2, 691.3, 340/691.4, 691.5, 691.6, 12.51, 12.52, 12.53
See application file for complete search history.

(56) References Cited

U.S. PATENT DOCUMENTS

| | | | |
|---|---|---|---|
| 6,363,334 B1 * | 3/2002 | Andrews et al. | 703/13 |
| 6,744,740 B2 | 6/2004 | Chen | |
| 7,289,466 B2 | 10/2007 | Kore et al. | |
| 7,295,556 B2 | 11/2007 | Roese et al. | |
| 7,457,860 B2 * | 11/2008 | Shang et al. | 709/223 |
| 7,786,885 B2 | 8/2010 | Payton | |
| 7,812,718 B1 * | 10/2010 | Chan et al. | 340/539.13 |
| 7,855,684 B2 * | 12/2010 | Ryu et al. | 342/464 |
| 7,970,574 B2 | 6/2011 | Jin | |
| 8,054,226 B2 * | 11/2011 | Sahinoglu et al. | 342/451 |
| 8,054,762 B2 * | 11/2011 | Potkonjak | 370/254 |
| 2002/0045455 A1 | 4/2002 | Spratt | |
| 2002/0187770 A1 | 12/2002 | Grover et al. | |
| 2003/0117966 A1 * | 6/2003 | Chen | 370/255 |
| 2004/0147223 A1 * | 7/2004 | Cho | 455/41.2 |
| 2005/0030904 A1 | 2/2005 | Oom Temudo de Castro et al. | |
| 2005/0261004 A1 * | 11/2005 | Dietrich et al. | 455/456.2 |
| 2006/0039300 A1 | 2/2006 | Ogier et al. | |
| 2006/0046664 A1 * | 3/2006 | Paradiso et al. | 455/96 |

(Continued)

OTHER PUBLICATIONS

Notice of Allowance, issued in U.S. Appl. No. 12/415,523, mailed Aug. 12, 2011, 8 pages.

(Continued)

*Primary Examiner* — Jinsong Hu
*Assistant Examiner* — Magdi Elhag
(74) *Attorney, Agent, or Firm* — Brundidge & Stanger, P.C.

(57) ABSTRACT

Techniques are generally described for determining locations of a plurality of communication devices in a network. In some examples, methods for determining locations of a plurality of communication devices in a network may comprises formulating the determination as a quantitative problem based at least in part on one or more attributes between individual communication devices and one or more beacon nodes whose locations are known, wherein the quantitative problem is expressed in terms of an objective function, one or more constraints, and one or more models, and solving the quantitative problem to determine the location of at least a portion of the one or more communication devices, wherein the solving includes manipulation of at least the objective function, one of the one or more constraints or one of the one or more models. Additional variants and embodiments are also disclosed.

6 Claims, 14 Drawing Sheets

U.S. PATENT DOCUMENTS

| | | | |
|---|---|---|---|
| 2006/0077918 A1* | 4/2006 | Mao et al. | 370/310 |
| 2006/0281470 A1* | 12/2006 | Shi et al. | 455/456.2 |
| 2007/0042706 A1* | 2/2007 | Ledeczi et al. | 455/3.01 |
| 2007/0207750 A1 | 9/2007 | Brown et al. | |
| 2008/0080441 A1 | 4/2008 | Park et al. | |
| 2008/0232281 A1 | 9/2008 | Pahlavan et al. | |
| 2008/0309556 A1* | 12/2008 | Hohl | 342/451 |
| 2009/0069020 A1 | 3/2009 | Wang et al. | |
| 2010/0148977 A1 | 6/2010 | Tseng et al. | |
| 2010/0150070 A1 | 6/2010 | Park et al. | |
| 2010/0246438 A1* | 9/2010 | Potkonjak | 370/254 |

OTHER PUBLICATIONS

Koushanfar, F., "Iterative Error-Tolerant Location Discovery in Ad-hoc Wireless Sensor Networks," Master of Science in Electrical Engineering Thesis, 2001, 101 pages, University of California Los Angeles.

Savarese et al., "Robust Positioning Algorithms for Distributed Ad-Hoc Wireless Sensor Networks," Usenix 2002 Annual Technical Conference, Jun. 2002, pp. 317-327.

Office Action, issued in U.S. Appl. No. 12/415,523, mailed Jan. 11, 2011, 9 pages.

Andreas Savvides et al., "Dynamic Fine-Grained Localization in Ad-Hoc Hetworks of Sensors," In Proceedings of the Seventh ACM Annual International Conference on Mobile Computing and Networking (MobiCom), Jul. 2001, pp. 166-179.

Andreas Mantik Ali et al., "An Empirical Study of Collaborative Acoustic Source Localization," Information Processing in Sensor Networks, Proceedings of the 6th international conference on Information processing in sensor networks, Apr. 2007, pp. 41-50.

Jessica Feng et al., "Consistency-Based On-line Localization in Sensor Networks," IEEE International Conference on Distributed Computing in Sensor Systems No. 2, Second IEEE International Conference, Jun. 18-20, 2006, vol. 4026, pp. 529-545.

Office Action, issued in U.S. Appl. No. 12/479,565, mailed Oct. 11, 2011, 15 pages.

C. Peng et al., "BeepBeep: A High Accuracy Acoustic Ranging System using COTS Mobile Devices", Sensys 2007, p. 1-14.

L. Girod et al., "The Design and Implementation of a Self-Calibrating Distributed Acoustic Sensing Platform", In Sensys 2006, pp. 71-84.

J. Ash et al., "Robust System Multiangulation Using Subspace Methods", In IPSN 2007, pp. 61-68.

B. Kusy et al., "Radio interferometric tracking of mobile wireless nodes", MobiSys 2007, pp. 139-151.

K. Whitehouse et al., "The Effects of Ranging Noise on Multi-hop Localization: An Empirical Study", IPSN 2005.

M. Li et al., "Rendered Path: Range-Free Localization in Anisotropic Sensor Networks with Holes", MobiCom 2007, pp. 51-62.

M. Rudafshani et al., "Localization in Wireless Sensor Networks", IPSN 2007, pp. 51-60.

L. Girod, "Development and Characterization of an Acoustic Rangefinder", Technical Report USC-CS-00- 728, Apr. 2000.

L. Girod et al., "Robust Range Estimation using Acoustic and Multimodal Sensing", IEEE/RSJ International Conference on Intelligent Robots and Systems, 2001.

J. Feng, "Location Discovery in Sensor Networks", Technical Report UCLA, Apr. 2008 (uploaded as two separate PDF files due to size).

* cited by examiner

Computing Program Product 701

Signal Bearing Medium 703

705
One or more instructions to:
- implement a model comprising a plurality of monotonic piece-wise linear functions, to enable an apparatus to model distance measurement error between a communication node and a beacon node
- implement a plurality of piece-wise linear functions to enable an apparatus to model location discovery error
- implement a distance calculation error model
- implement a scalable indoor or outdoor model
- implement an individual mobility model
- determine a location of each of one or more communication nodes in a network
- serially add one or more nodes to a network
- simultaneously add a plurality of nodes to a network
- determine a location discovery beacon infrastructure for a network

| 707<br>A computer readable medium | 709<br>A recordable medium | 711<br>A communications medium |
|---|---|---|

Fig. 15

EFFICIENT LOCATION DISCOVERY

CROSS REFERENCE TO RELATED APPLICATION

The present application is related to contemporaneously filed, U.S. patent application Ser. No. 12/415,523, entitled, "Network Node Location Discovery," the entire specification of which is hereby incorporated by reference its entirety for all purposes, except for those sections, if any, that are inconsistent with this specification.

BACKGROUND

Wireless communication networks are becoming increasingly popular. A wireless network may include plurality of wireless devices. In some applications, the locations of some of the wireless devices may be known, while the location of one or more remaining wireless devices in the wireless network may need to be determined. Such determination may be useful for a variety of applications, such as navigation, tracking, and so forth. Improved determination techniques may facilitate the effectiveness of many sensing and communication procedures.

BRIEF DESCRIPTION OF THE DRAWINGS

Subject matter is particularly pointed out and distinctly claimed in the concluding portion of the specification. The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. Various embodiments will be described referencing the accompanying drawings in which like references denote similar elements, and in which:

FIG. 15 illustrates an example computing program product in accordance with various embodiments, all arranged in accordance with the present disclosure.

DETAILED DESCRIPTION OF ILLUSTRATIVE EMBODIMENTS

Figure 1:
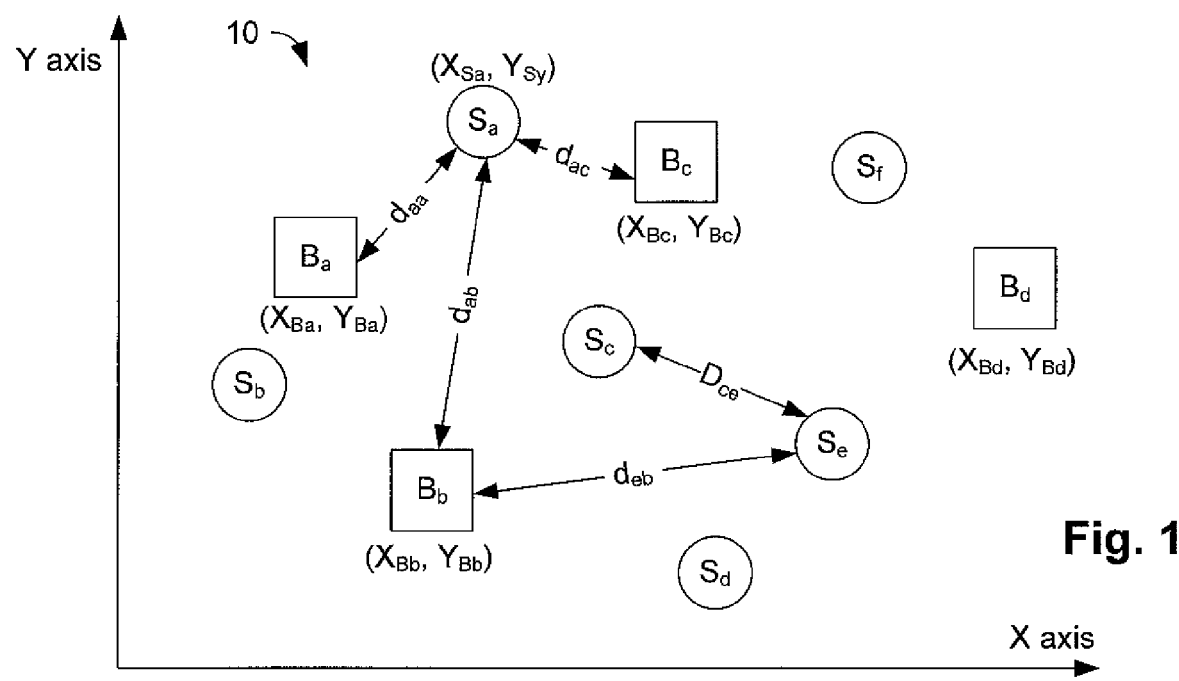
FIG. 1 illustrates an example wireless network.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, systems and computer program products related to efficient location discovery in a wireless network.

FIG. 1 illustrates an example wireless network 10, in accordance with various embodiments of the present disclosure. The network 10 may be any appropriate type of wireless network, including but not limited to a wireless ad hoc network, a mobile ad hoc network, a wireless mesh network, a wireless sensor network, or the like. The wireless network 10 may include a plurality of communication nodes Sa, . . . , Sf and a plurality of beacon nodes Ba, . . . , Bd. In various embodiments, the individual communication nodes Sa, . . . , Sf and/or the beacon nodes Ba, . . . , Bd may be capable of communicating with other nodes and/or other wireless devices within network 10 using an appropriate wireless protocol, such as, but not limited to, Institute of Electrical and Electronics Engineers (IEEE) 802.11 standards (e.g., 802.11g, released on June, 2003). In various embodiments, the communication nodes may comprise of one or more appropriate wireless communication devices.

It should be noted that although individual nodes in the network 10 may be identified either as a communication node or a beacon node, in various embodiments, the difference between the two type nodes, for the purpose of this disclosure, may be the location knowledge that is available to the beacon nodes, as will be discussed in more details herein later. In various embodiments, the beacon nodes may also act as a communication node, and vice versa, and the labeling of a node as a communication node and/or a beacon node is not intended to limit other functionalities of the node. In various embodiments, a communication node may also act as a beacon node. For example, once the location of a communication node Sa is determined using one of the various methods described in more details later in this disclosure, the node Sa may subsequently act as a beacon node while facilitating determination of the locations of other communication nodes (e.g., nodes Sb, Sc, etc). In various embodiments, a beacon node may also act as a communication node in case the beacon node loses its location determination capability due to, for example, loss of its GPS capabilities, suspicious readings on the GPS system, etc. For the purpose of this disclosure and unless otherwise stated, the phrase node (without specific mention of its type) may refer to a communication node and/or a beacon node.

As illustrated, an X-axis and a Y-axis may be analytically superimposed on the network 10 to permit locating one or more nodes with respect to the two axes. The number and location of the nodes illustrated in FIG. 1 may be purely exemplary in nature. In other embodiments, the disclosure may be practiced with more or less nodes of either type or additional node types, or different locations of the nodes. For example, although all the nodes may be illustrated to be located in the first quadrant of the coordinate system of FIG. 1 (e.g., positive x and y coordinates), in various embodiments, one or more beacon nodes and/or communication nodes may also be located in other quadrants as well.

In various embodiments, the location of one or more beacon nodes Ba, . . . , Bd may be known relative to the two analytical axes (hereinafter, simply axes). For example, the location coordinates of the beacon node Ba (e.g., $(X_{Ba}, Y_{Ba})$) with reference to the X-axis and the Y-axis may be known to the beacon node Ba. Similarly, the coordinates of the beacon nodes Bb, . . . , Bd (e.g., $(X_{Bb}, Y_{Bb})$, . . . , $(X_{Bd}, Y_{Bd})$) may also be known to the respective beacon nodes. In various embodiments, one or more beacon nodes may be equipped with a global positioning system (GPS) or any other appropriate location identification system through which the beacon nodes may identify their respective locations. In other embodiments, some or all the beacon node locations may be predetermined. In various embodiments, the location information may be shared with one or more peer or server devices.

In various applications, it may not, however, be feasible to predetermine or equip all the nodes with GPS or other location identification system due to, for example, high cost, low battery life, larger size, weight, etc. of such a system. Accordingly, in various embodiments, location of one or more communication nodes Sa, . . . , Sf may not be pre-known, and/or one or more communication nodes may not be equipped with, for example, a GPS system. For example, the location coordinates of the communication node Sa (e.g., $(X_{Sa}, Y_{Sa})$) relative to the X-axis and the Y-axis may be unknown to the node Sa and/or to other nodes in the network 10. Thus, in various embodiments, the location(s) of one or more communication nodes in network 10 may be determined.

In various embodiments, there may be different types of communication between any two nodes of the network 10. For example, a node may transmit acoustic signals that may include information related to such a node (e.g., location information of such a node, if known), and may also receive acoustic signals transmitted by other nodes. In various embodiments, a node may also transmit and receive radio signals for transmitting and receiving data and/or other information. In various embodiments, an acoustic signal range (ASR) of a node may be independent from a radio signal range (RSR) of the node. Furthermore, all nodes in the network may not have the same ASR and RSR properties.

In various embodiments, reception of appropriate signals by a first node from a second node may permit the first node to determine a distance between the first node and the second node. In various embodiments, determination of distance between two nodes may be performed using techniques known to those skilled in the art.

For example, a node may be configured to receive acoustic signals from one or more neighboring nodes, and may be configured to determine distances between such a node and the one or more neighboring nodes. In various embodiments, a node may be configured to receive acoustic signals from one or more nodes that are within an ASR of the node, wherein the acoustic signals may include location information about the respective one or more nodes. In various embodiments, other types of signals (e.g., radio signals) may also include location information about a node, and it may be possible to determine a distance between two nodes based at least in part on one of the nodes receiving a radio signal from another node.

For example, communication node Sa may receive signals from neighboring beacon nodes Ba, Bb, and Bc, and may be able to determine distances $d_{aa}$, $d_{ab}$, and $d_{ac}$ between the communication node Sa and beacon nodes Ba, Bb, and Bc, respectively. In various embodiments, communication node Sa may also receive signal transmissions from beacon node Bd if node Sa is within a signal range of node Bd, and in that case, node Sa may determine a distance $d_{ad}$ (not illustrated in FIG. 1) between node Sa and beacon node Bd. Similarly, other communication nodes Sb, . . . , Sf may also determine distances between the respective communication node and one or more neighboring beacon nodes. In various embodiments, a first communication node may also be configured to determine a distance between the first communication node and a second communication node. For example, communication node Sc may be configured to estimate a distance $D_{ce}$ between communication nodes Sc and Se.

It should be noted that although individual nodes in the network 10 may be identified either as a communication node or a beacon node, in various embodiments, a difference between the two types of nodes, for the purpose of this disclosure, may be the location knowledge that is available to the beacon nodes. It should be apparent to those skilled in the art that the beacon nodes may also act as a communication node, and vice versa, and the labeling of a node as a communication node and/or a beacon node is not intended to limit other functionalities of the node. In various embodiments, a communication node may also act as a beacon node. For example, once the location of a communication node Sa is determined using one of the various methods described in more details later in this disclosure, the node Sa may subsequently act as a beacon node while facilitating determination of the locations of other communication nodes (e.g., nodes Sb, Sc, etc.). In various embodiments, a beacon node may also act as a communication node in case the beacon node loses its location determination capability due to, for example, loss of its GPS capabilities, suspicious readings on the GPS system, etc.

In various embodiments, for the purpose of this disclosure and unless otherwise stated, subsequent mention of the phrase "network" would indicate a wireless communication network (such as network 10 of FIG. 1) that may include a plurality of communication nodes (one or more of whose locations may need to be determined) and a plurality of beacon nodes (one or more of whose locations may be known or already determined). In various embodiments, the number and/or configuration of communication and/or beacon nodes in such a "network" may not be restricted by the number and/or configuration of communication and/or beacon nodes in the network 10 of FIG. 1.

In various embodiments, for the purpose of this disclosure and unless otherwise stated, neighboring nodes of a first node may include at least those nodes from which the first node may receive signal transmission that may permit the first node (or vicariously via a peer/server device) to determine the distance from the first node to those nodes. For example, in the network 10 of FIG. 1, if the communication node Sb may determine its distance from nodes Ba, Bb, Sa, and Sc, then at least these nodes may be the neighboring nodes of the node Sb. Similarly, if Sb is unable to determine its distance from node Bd (as Sb may not receive any signal from Bd because of, for example, a large distance between the two nodes), then Bd may not be a neighboring node of Sb.

Although the nodes in FIG. 1 are illustrated to be in a two dimensional plane (e.g., x-y plane), in various embodiments, the inventive principles discussed in this disclosure may be extended to a three dimensional space as well (by adding a third vertical dimension or z-axis).

Distance Measurement Error Model

In practice, due to a number of reasons (e.g., obstacle between two nodes, noise in measurement, large network size, large number of nodes deployed in the network, interference, technology used for distance measurement, etc.), distance determination between any two nodes may include inaccuracy. In various embodiments, a distance measurement error model may be constructed to model the error probability related with distance determination between any two nodes.

Figure 2:
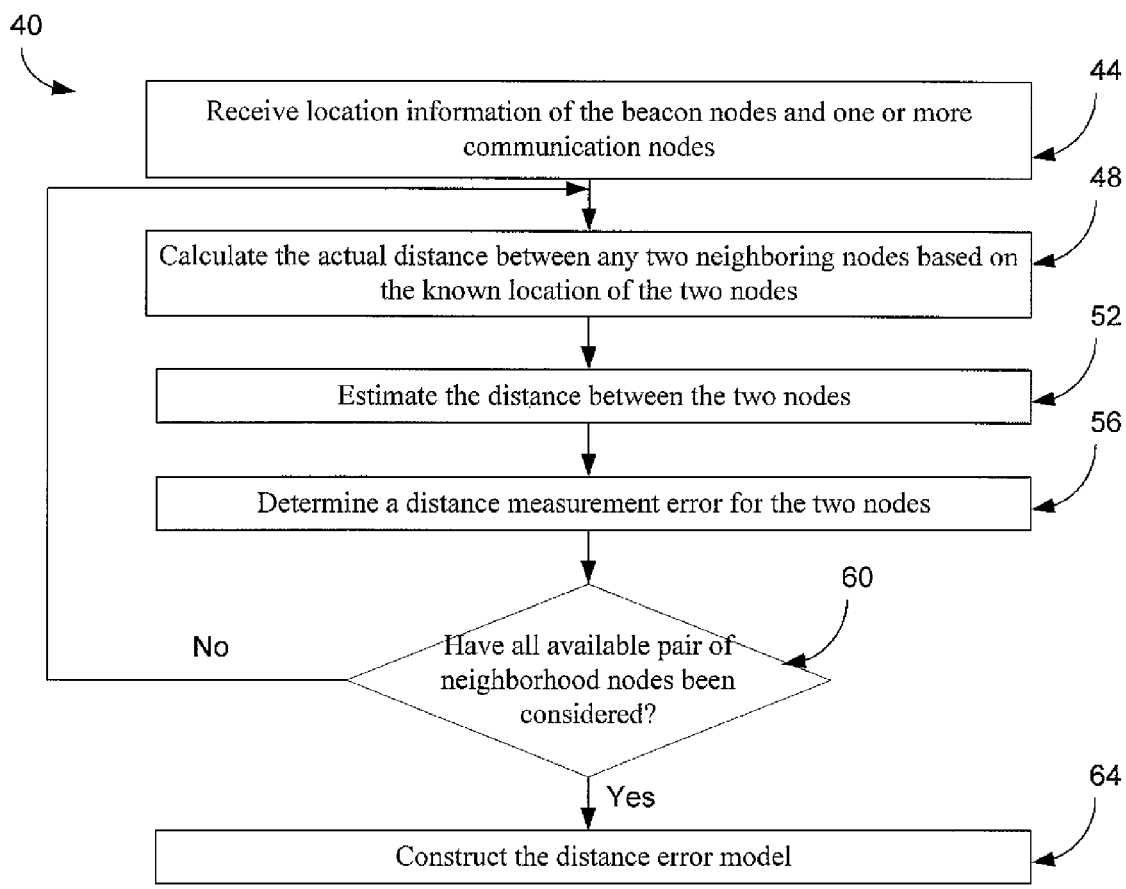
FIG. 2 illustrates an example method for constructing a distance error measurement model.

FIG. 2 illustrates an example method 40 for constructing a distance error measurement model, in accordance with various embodiments of the present disclosure. In various embodiments, at block 44, the location of one or more communication nodes in a network may be known in addition to the known location of one or more beacon nodes in the network. For example, the location of one or more communication nodes in a network may be known for at least the purpose of constructing such a model in an experimental set up. In various embodiments, the location information of the nodes may be received by the respective nodes. Alternatively, in various embodiments, a centralized computing device (not illustrated in FIG. 1), a user, and/or an administrator of the network may receive the location information.

In various embodiments, at block 48, from the known locations of any two neighboring nodes (e.g., a communication node and a beacon node), the actual distance between the two nodes may be calculated. At block 52, the distance between the two nodes may be estimated, using one of many techniques known to those skilled in the art, based at least in part on one of the nodes receiving signals from the other node. The actual and the estimated distances between the two nodes may be compared to determine, at block 56, a distance measurement error for the two nodes. In various embodiments, this distance measurement error may be an indication of accuracy of distance determination (or distance estimation, since some amount of inaccuracy may be involved) between the two nodes.

The process may be repeated, at block 60, for other possible pair of neighboring nodes, and at block 64, a distance error model may be constructed based at least in part on the determined distance measurement error for possible pairs of neighboring nodes.

Figure 3:
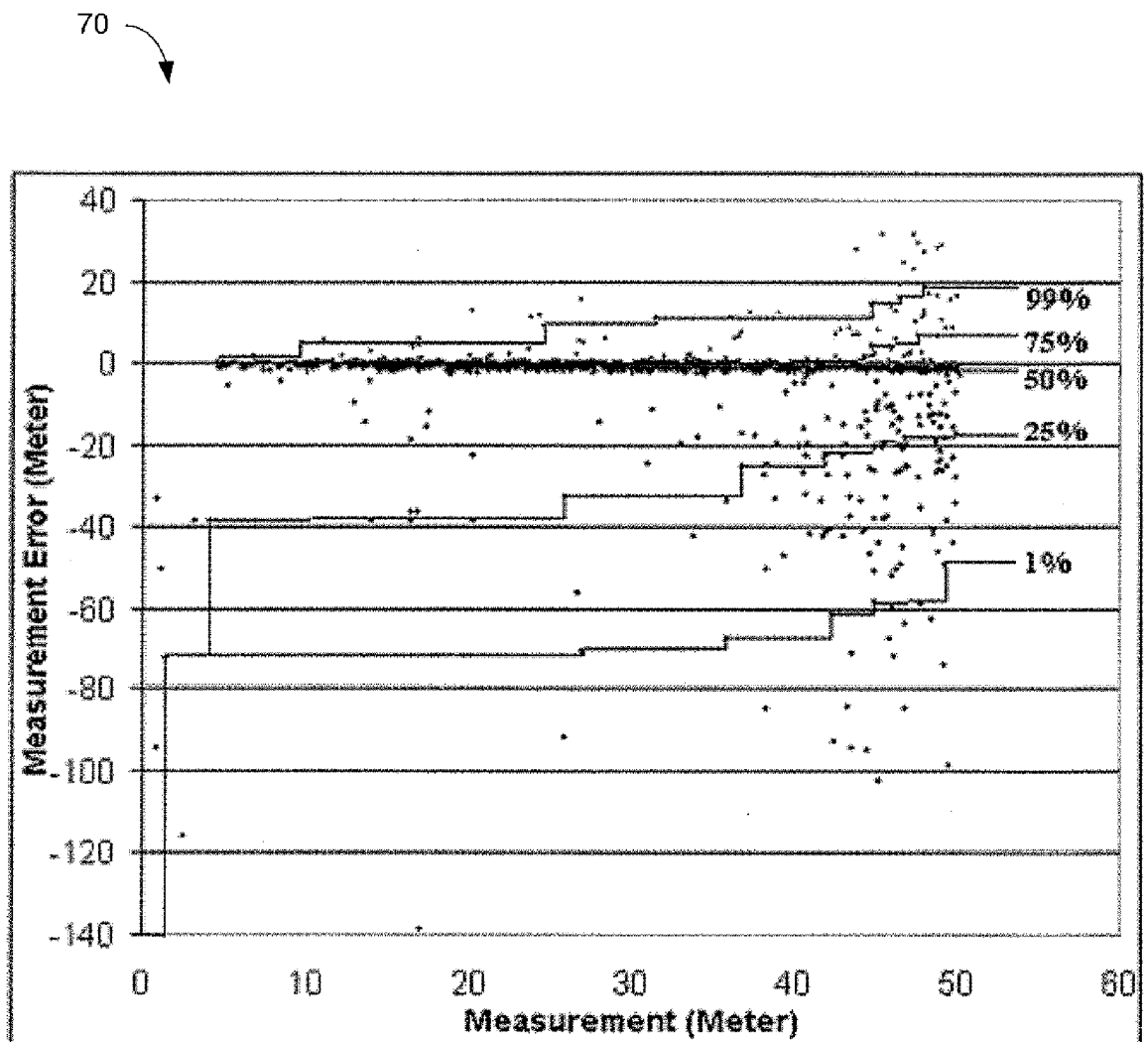
FIG. 3 illustrates an example distance measurement model.

FIG. 3 illustrates an example distance measurement model 70, in accordance with various embodiments of the present disclosure. The distance measurement model 70 includes a graph plotting a plurality of estimated distances (meters) and the associated measurement errors (meters) for an example wireless network. The data in the figure may be from a wireless network, similar to that in FIG. 1, that may employ a larger number of communication nodes and beacon nodes (e.g., the total number of nodes may be between 79 and 93, with 90 being an average number of nodes). More specifically, FIG. 3 illustrates about 2,000 pairs of estimated distance measurements (x-axis) and their corresponding measurement errors (y-axis). These two sets of data may be the input to the distance measurement error model 70.

As observed from FIG. 3, for the example network, the longer the measurement distance between two nodes, the greater may be the probability of error in the measurement. That is, as distance measurements grow larger, they may be more prone to error, as indicated by larger number of scattered data points beyond, for example, at around 40 meter (m) mark along the x-axis. Also, nodes that may be further apart (e.g., more than at around 50 m apart) may be out of each other's signal range, and may not be able to exchange location and distance measurement information, resulting in substantially less number of measurements beyond the 50 m range.

In various embodiments, the distance measurement error model 70 may be constructed based at least in part on the concept of consistency, and the model may be represented in terms of monotonic piece-wise linear functions. Individual monotonic piece-wise linear functions in FIG. 3 may correspond to a percentage of the points that forms the lowest C % of a cumulative density function (CDF). For example, five different values of C are illustrated in FIG. 3. Individual monotonic piece-wise linear functions may describe the probability of any given measurement that may have certain error with confidence C %. For example, for a distance measurement of 10 m, according to the piece-wise linear function C=75%, there may be a 75% probability that the distance measurement error may be 0.087 m or less. In another example, for a distance measurement of 45 m, there may be a 75% probability that the measurement may have an error of 4.33 m or less.

Instrumented Environment Models

In various embodiments, estimation of distance between two nodes and subsequent estimation of location of a communication node may be related to the environment in which the nodes may be deployed. For example, some or all the nodes may be deployed in an indoor environment and/or an outdoor environment, with one or more obstacles (e.g., trees, buildings, walls, etc.) in the environment that may hinder communication between two nodes. To more accurately depict the environment in which the nodes may be deployed, an outdoor and an indoor environmental model may be developed that may be scalable both in terms of size and resolution and may mimic an actual environment, and both the models may be parameterized in terms of size, resolution, density and level of clustering of the obstacles.

Figure 4A:
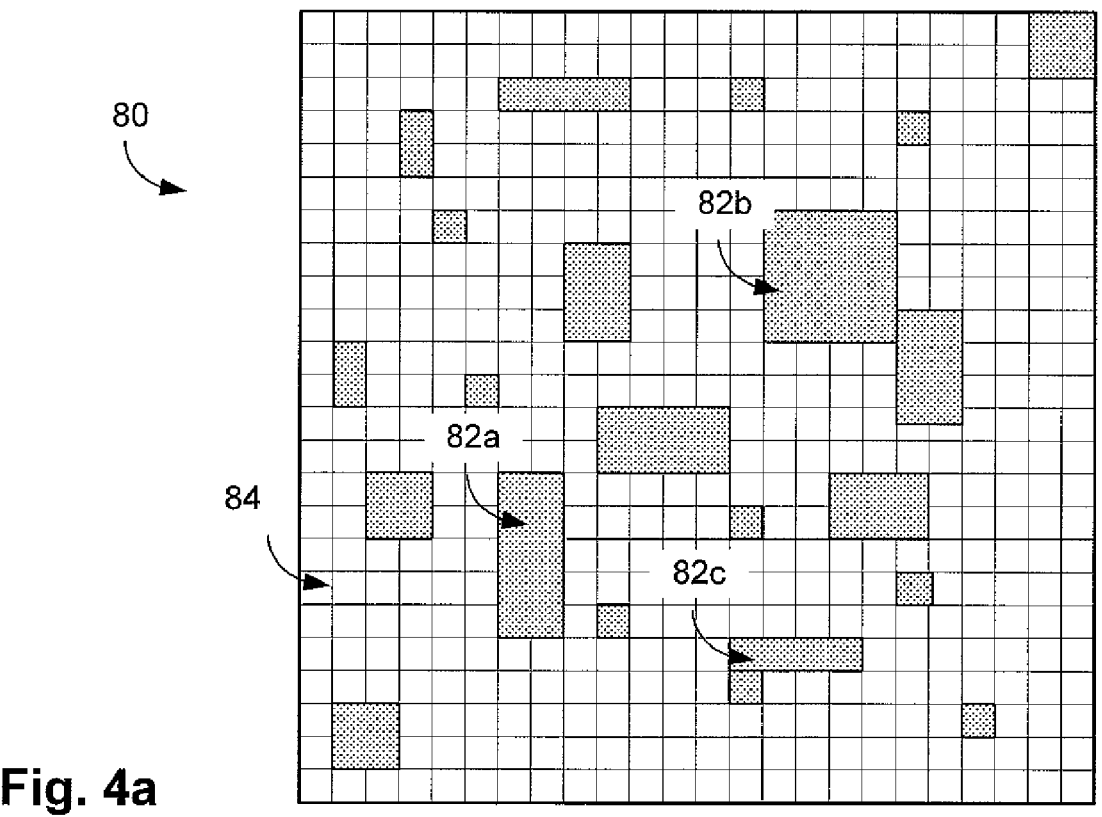
FIG. 4a illustrates an example outdoor environmental model.

FIG. 4a illustrates an example outdoor environmental model 80, in accordance with various embodiments of the present disclosure. The model may be divided in a number of grids 84 and the grey portion in the model may depict obstacles (e.g., obstacles 82a, 82b, 82c, etc.), which may be, for example, buildings, trees, walls, buses, etc. In various embodiments, the outdoor environmental model may employ a number of modeling paradigms, including but not limited to, statistical fractals and interacting particles. Fractals may ensure that for individual levels of resolution, the environment may be statistically isomorphic. Also, interacting particles may be used as the mechanism to maintain a specified density of obstacles and to create a specified level of clustering in order to enforce self-similarity at different levels of granularity.

In various embodiments, the outdoor environmental model 80 may be created using an iterative procedure. Initially, obstacles may be placed at random positions according to a uniform distribution in a model that may be divided in a plurality of grid cells. The amount or size of initial obstacles may be configurable. In order to cluster obstacles, individual grid cells in the model may contact its 8 neighboring cells and may update whether any of the neighboring grid cells has obstacles by generating a random number in the range of, for example, 0-9. For example, if the cell does not have an obstacle and none of its neighbors are occupied, the cell may stay unoccupied. However, if a certain threshold number of a cell's neighbors are occupied, the cell may also change to an occupied status. The random number may be generated in such a way that the obstacle density level may stay at a user specified value. Thus, the obstacles may be iteratively generated according to a probability dictated by a non-uniform distribution that favors clustering of the obstacles to a certain degree. After a certain programmable time limit, the resolution of the model 80 may be increased and the procedure may be repeated. At individual levels of granularity, the user specified percentage of field may be frozen to create a fractal nature of the overall obstacle distribution.

Figure 4B:
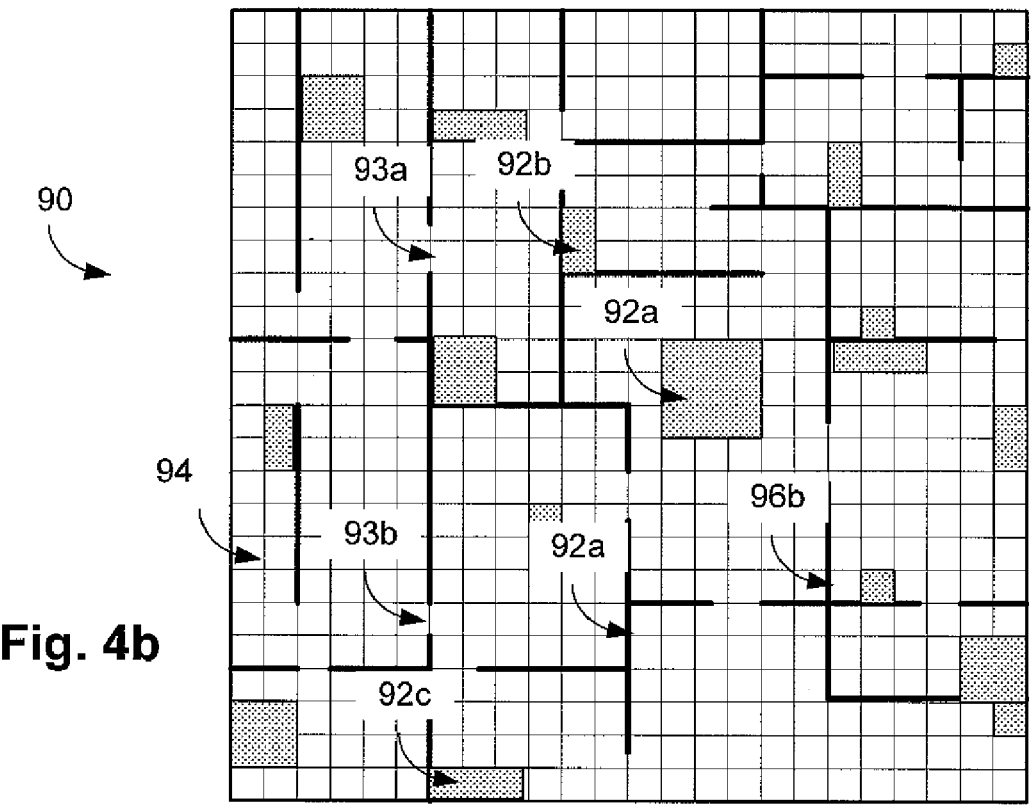
FIG. 4b illustrates an example indoor environmental model.

FIG. 4b illustrates an example indoor environmental model 90, in accordance with various embodiments of the present disclosure. The indoor environmental model 90 may be populated by walls (e.g., 96a, 96b, etc., illustrated by darkened lines in FIG. 4b) using a recursive procedure where at individual steps an orthogonal wall may be added at a randomly selected position so it may not cross any of the existing walls. In various embodiments, minimum distance between two parallel obstacles (e.g., two walls) may be maintained while generating the walls. A user specified clustering distribution may be used to prevent the walls being placed too close to each other. In addition, a certain number of doors (e.g., doors 93a, 93b, etc.) may be specified using uniform random distribution such that individual rooms may have at least one door, for example. To facilitate the imposition of mobility and the addition of obstacles in a room, a grid 94 may be analytically superimposed on the model. Additionally, one or more obstacles 92a, 92b, 92c, etc. may also be added using the previously described outdoor obstacle model.

Mobility Models

In various embodiments, one or more nodes of a network (e.g., the network 10 of FIG. 1) may be dynamic or mobile in nature. For example, one or more nodes may move, new nodes may join the wireless network, or existing node may leave the network. In various embodiments, the mobility of the nodes may be captured using a mobility model. There may be different types of mobility models. For example, a node may roam or be mobile individually, e.g., independent of other nodes. In other examples, two or more nodes may be mobile such that the mobility of one node affects the mobility of one or more other nodes. Accordingly, in various embodiments, there may be at least two types of mobility models: individual and group mobility models.

In various embodiments, for an individual mobility model, the previously discussed fractal approach may be used to generate a likelihood that a node may be at a particular grid cell. Subsequently, another random stationary position may be generated, where the node may want to move. In various embodiments, a randomized shortest path (e.g., the Dijkstra shortest path) may be created for a movement trajectory from the initial position of the node to the final position. In various embodiments, the path may be altered using a Gaussian distribution offset at a programmable density. The density may also be subject to small Gaussian noise. In various embodiments, at individual positions, a node may spend time according to a sampling from, for example, a Power law distribution.

In various embodiments, a group mobility model may be generated, for example, using correlation matrices. For a pair of neighboring nodes, a likelihood of the two nodes spending time together may be generated, for example, according to a Power law. Various rules may be generated for the group mobility. For example, two or more nodes may be assumed to spend joint time, such that both nodes move in a substantially similar direction, possibly in parallel and separated by a small distance. Several other group mobility scenarios may be used.

Enabling Location Discovery (LD)

As previously discussed with reference to FIG. 1, the locations of one or more beacon nodes in a network may be known, and it may be desirable to estimate the location of one or more of the communication nodes in the network.

Atomic Multilateration for Location Discovery

In various embodiments, in a wireless network that may include a plurality of communication and beacon nodes, the location of a communication node S, with an unknown location $(X_S, Y_S)$ may be estimated. In various embodiments, the communication node S may have at least a number of beacon nodes, $N_B$, as its neighbor(s). As previously discussed, it may be possible to estimate the distance between the communication node S and its neighboring nodes. Thus, it may be possible to estimate the distance between the communication node S and individual neighboring beacon nodes. For example, let $d_{is}$ denote the estimated distance between $i^{th}$ ($i=1,2,\ldots,N_B$) beacon node Bi (with coordinates $(X_{Bi}, Y_{Bi})$) and communication node S. The error $\epsilon_i$ in the measured distance between node S and the $i^{th}$ beacon node Bi may be expressed as the difference between the measured distance and the estimated Euclidean distance, which may be given as:

$$\epsilon_i = \sqrt{(X_{Bi}-X_s)^2+(Y_{Bi}-Y_s)^2} - d_{is} \qquad \text{Equation (1).}$$

In various embodiments, an objective function may be to minimize the likelihood of errors according to a location discovery error model (discussed in more details herein later). The term "minimize" and/or the like as used herein may include a global minimum, a local minimum, an approximate global minimum, and/or an approximate local minimum.

Likewise, it should also be understood that, the term "maximize" and/or the like as used herein may include a global maximum, a local maximum, an approximate global maximum, and/or an approximate local maximum.

The objective function, for example, may be:

OF: min M($\epsilon_i$), where $\epsilon_i = \sqrt{(X_{Bi}-X_x)^2 + (Y_{Bi}-Y_s)^2} - d_{is}$   Equation (2), where M($\epsilon_i$) may be an expected location discovery error according to the location discovery error model. In various embodiments, it may be desired to obtain a linearized version of the objective function of equation 2, by manipulating the objective function or the associated constraint.

In various embodiments, equation 1 may be simplified as follows:

$d_{is}^2 + 2d_{is}\epsilon_i + \epsilon_i^2 = X_{Bi}^2 - 2X_{Bi}X_S + X_S^2 + Y_{Bi}^2 - 2Y_{Bi}Y_S + Y_S^2$   Equation (3).

Similarly, error $\epsilon_j$ in the measured distance between node S and the $j^{th}$ beacon node Bj may be expressed as:

$\epsilon_j = \sqrt{(X_{Bj}-X_s)^2 + (Y_{Bj}-Y_s)^2} - d_{js}$   Equation (4)

or $d_{js}^2 + 2d_{js}\epsilon_j + \epsilon_j^2 = X_{Bj}^2 - 2X_{Bj}X_S + X_S^2 + Y_{Bj}^2 - 2Y_{Bj}Y_S + Y_S^2$   Equation (5).

Adding equations 4 and 5, the following equation may be obtained:

$d_{is}^2 + 2d_{is}\epsilon_i + \epsilon_i^2 + d_{js}^2 + 2d_{js}\epsilon_j + \epsilon_j^2 = (X_{Bi}^2 - X_{Bj}^2) + (Y_{Bi}^2 - Y_{Bj}^2) + 2(X_{Bj}-X_{Bi})X_S + 2(Y_{Bj}-Y_{Bi})Y_S$   Equation (6).

In various embodiments, a set of equations in the form of equation 6 may be solved optimally by utilizing, for example, singular value decomposition (SVD) under the assumption that the ranging error model follows the Gaussian distribution, as is well known to those skilled in the art. However, as previously disclosed herein in more details while discussing the distance measurement error model 70, the ranging errors of real deployed nodes may not always follow the Gaussian distribution. Instead, the ranging errors may have relatively complex forms that may not be captured by existing parametric distributions.

Accordingly, it may be desirable to manipulate equations 4 and 5 to obtain a piece-wise linear model. Modeling nonlinearity with piece-wise monotonic lines may have benefits like flexibility and faster convergence.

In various embodiments, in equation 6, the error term $\epsilon_i$ may be relatively smaller compared to the term $d_{is}$ (e.g., $\epsilon_i \ll d_{is}$), and the error term $\epsilon_j$ may be relatively less compared to the term $d_{js}$ (e.g., $\epsilon_j \ll d_{js}$), and hence, the terms $\epsilon_i^2$ and $\epsilon_j^2$ may be ignored in equation 5. Additionally, in various embodiments, the terms $d_{is}^2, d_{js}^2, X_{Bi}^2, X_{Bj}^2, Y_{Bi}^2$ and $Y_{Bj}^2$ may be constant. Accordingly, equation 5 may be simplified as $C_i \epsilon_i + C_j \epsilon_j = C_{ij} + B_x X_S + B_y Y_S$   Equation (7), wherein $C_i$, $C_j$, and $C_{ij}$ may comprise of appropriate constant terms, and $B_x = (X_{Bj} - X_{Bi})$, and $B_y = (Y_{Bj} - Y_{Bi})$.

In various embodiments, an objective function (OF) may be:

$OF: \min_{i=1,\ldots,N} L(\epsilon_i)$   Equation (8)

such that (s.t.) $C_i \epsilon_i + C_j \epsilon_j = C_{ij} + B_x X_S + B_y Y_S$   Equation (9)

for all $\begin{cases} i = 1, \ldots, N_B \\ j = 1, \ldots, N_B \\ i \neq j \end{cases}$ where L may be an appropriate piece-wise linear approximation applied on the measurement errors.

In various embodiments, in order to include information about likelihood of individual error terms in the above defined linear programming problem while preserving a polynomial run time solution, an approximation of a probability of the error terms $\epsilon_i$, i=1, . . . , $N_B$, may be utilized. An example approximation of the error term $\epsilon_i$ has been illustrated in FIG. 5. The initial convex curve of FIG. 5 may have a form that captures the probability of error $\epsilon_i$. Thus, the error $\epsilon_i$ may be divided as $\epsilon_i \rightarrow \epsilon_{i1}, \epsilon_{i2}, \ldots, \epsilon_{iNB}$, to obtain a piece-wise linear approximation of the function L($\epsilon_i$) (with C1, C2, . . . CN denoting the approximate slope of the approximate linear function) while preserving a polynomial run time solution.

In various embodiments, utilizing the piece-wise linear approximation as discussed above and as illustrated in FIG. 5, the objective function of equation 6 may be simplified as:

$OF: \min g_i \epsilon_i$, where $\epsilon_i = (C_1 \epsilon_{i1} + C_2 \epsilon_{i2} + \ldots + C_N \epsilon_{iN})$   Equation (10)

In various embodiments, the terms in the constraints of equation 8 may also be updated as:

$h_i \epsilon_i \rightarrow h \epsilon_{i1} + h \epsilon_{i2} + \ldots + h \epsilon_{iN}$, where $\epsilon_{i1} \leq \epsilon'_{i1}, \epsilon_{i2} \leq \epsilon'_{i2}, \ldots, \epsilon_{iN} \leq \epsilon'_{iN}$   Equation (11).

The approximation and linearization of the objective function and constraints, as discussed with respect to equations 8, 9, 10 and 11, as well known to those skilled in the art, and hence, a more detailed description of these equations are omitted herein. In various embodiments, the objective function and constraints of equations 10 and 11 may be solved utilizing one or more linear programming tools, as is known to those skilled in the art.

Figure 6:
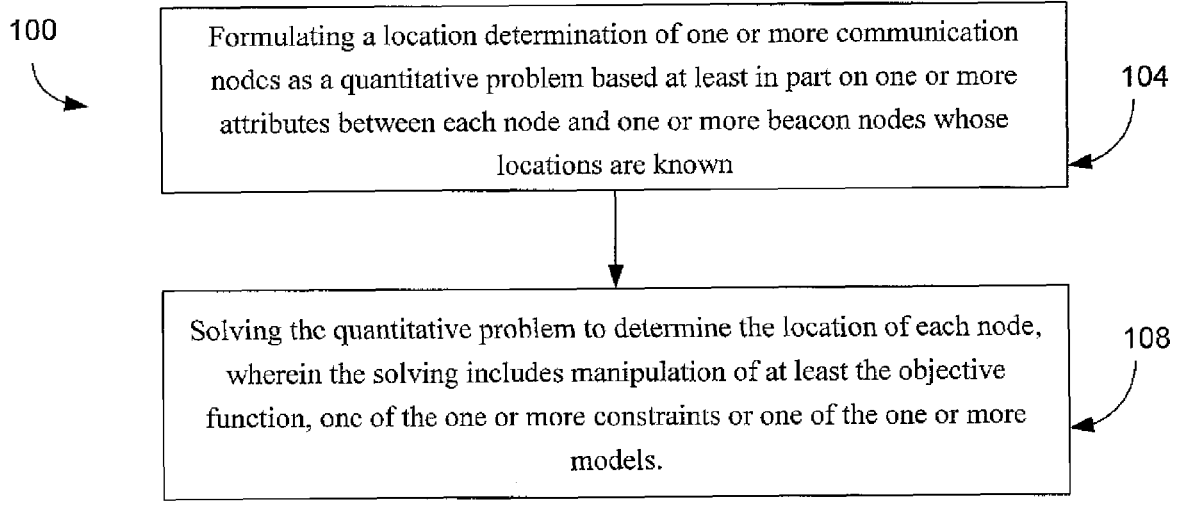
FIG. 6 illustrates an example method for enabling location discovery of a communication node.

FIG. 6 illustrates an example method 100 for enabling location discovery of a communication node, in accordance with various embodiments of the present disclosure. In various embodiments, the method 100 may include, at block 104, formulating a location determination of one or more communication nodes as a quantitative problem based at least in part on one or more attributes (e.g., distance between individual communication nodes and three of its neighboring beacon nodes, and/or other attributed like number of neighboring beacon and/or communication nodes, angle between individual communication nodes and two neighboring nodes, distance between individual communication nodes and three of its neighboring nodes, total hop count to other nodes in the network from a given communication node, etc.) between individual communication nodes and one or more beacon nodes whose locations are known. In various embodiments, one or more communication nodes (or one or more centralized device in the network) may be configured to estimate one or more of these attributes. In various embodiments, the quantitative problem may be expressed in terms of an objective function (e.g., equations 1 and 2), one or more constraints, and one or more models. In various embodiments, the formulated objective function and one or more constraints may be non-linear, as is the case with equations 1 and 2.

In various embodiments, the formulation at block 104 may be performed by individual communication nodes. In various other embodiments, individual communication nodes may transmit, to a centralized system, the estimated distances between the communication node and neighboring beacon nodes. In various embodiments, the centralized system may be a server, a distance estimation device, and the like.

In various embodiments, the formulating at block 104 may also include identifying a subset of the one or more communication nodes and the one or more beacon nodes such that the communication nodes in the subset have probabilities of relatively lower location discovery error as compared to one or more nodes that are not in the subset, and/or formulating the determination based at least in part on one or more attributes between individual communication nodes in the identified subset and one or more beacon nodes in the identified subset. Identification of such subset will be discussed in more details herein later.

In various embodiments, the method 100 may include, at block 108, solving the quantitative problem to determine the location of individual communication nodes, wherein the solving may include manipulation of at least the objective function, one of the one or more constraints or one of the one or more models. For example, as previously discussed, the objective function and the constraints in equations 1 and 2 (e.g., the formulated objective functions) may be manipulated to generate equations 8-11, which may be solved to determine the location of individual communication nodes. In various embodiments, the objective function and constraints generated by the manipulation may be piece-wise linear. In various other embodiments, the formulating and solving may be performed for one node at a time. In various other embodiments, the formulating and solving may be performed for a plurality of nodes simultaneously, employing, for example, non-linear programming (discussed herein later in more details).

Non-Linear Programming (NPL) for Location Discovery

In various embodiments, location discovery of various communication nodes may also be carried out through non-linear programming, and may be utilized to simultaneously locate multiple communication nodes. For example, let $S=\{S_i(X_{Si}, Y_{Si})\}$, $i=1, \ldots, S_N$, be a set of $S_N$ communication nodes with unknown locations, and $B=\{B_j(X_{Bj}, Y_{Bj})\}$, $j=1, \ldots, N_B$ be a set of $N_B$ beacons, where $N_B \geq 3$. In various embodiments, an objective function may be to minimize the likelihood of errors according to the previously discussed statistical distance measurement error model 70. For example, the objective function may be:

OF: min $M(\epsilon_{ij})$, where $\epsilon_{ij} = \sqrt{(X_{Si}-X_{Bj})^2 + (Y_{Si}-Y_{Bj})^2} - d_{ij}'$   Equation (12), where $d_{ij}$ may be the estimated distance between the $i^{th}$ communication node and $j^{th}$ beacon node. In various embodiments, $M(\epsilon ij)$ may be an expected location discovery error according to a location discovery error model discussed herein later. In various embodiments, equation 12 may be solved using an appropriate non-linear programming tool (e.g., Powell Algorithm), as is well known to those skilled in the art.

LD Partitioning and Iterative Fine-Tuning

As discussed in more detail below, a communication node with a large number of neighboring nodes may have, on an average, a probability of lower location discovery error. Other factors may also decrease probabilities of error during location discovery of a communication node, as discussed in more detail below. In various embodiments, to more accurately estimate locations of one or more communication nodes in a network, it may be advantageous to partition the network and determine locations of communication nodes that have probabilities of lower location discovery error. That is, it may be advantageous to isolate a subset of the communication nodes such that communication nodes in the subset may be able to locate themselves with probability of relatively better location discovery accuracy. Subsequently, the location information of these communication nodes may be used to determine the location of other communication nodes that may not be included in the subset (that is, subsequently, these communication nodes may be used like beacon nodes to determine location of the other communication nodes).

Figure 7:
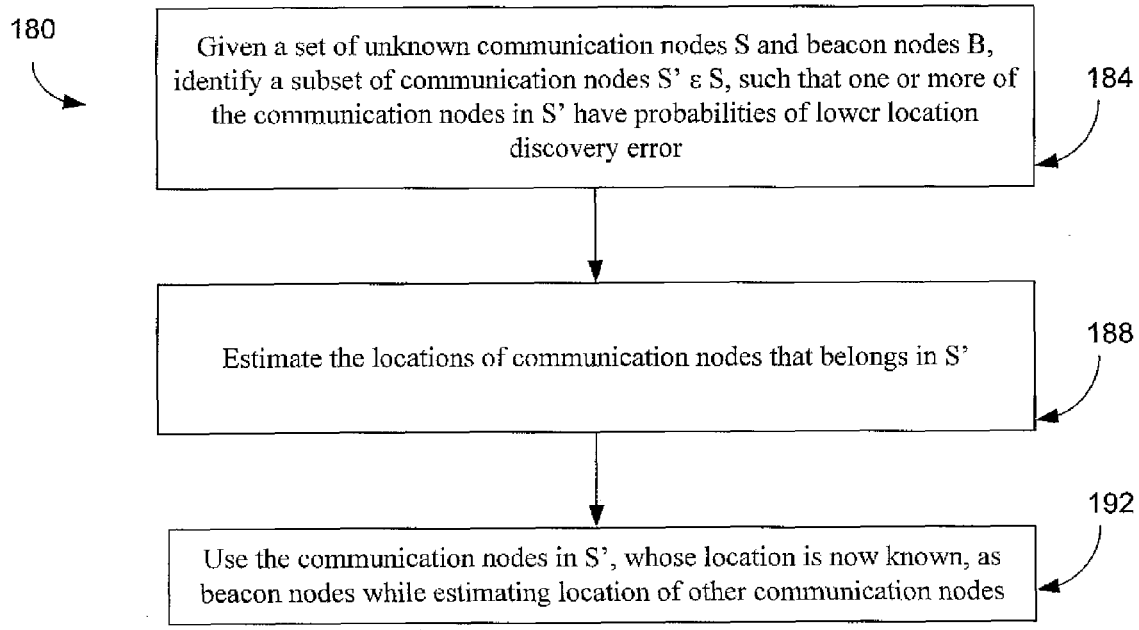
FIG. 7 illustrates an example method for partitioning a network.

FIG. 7 illustrates an example method 180 for partitioning a network, in accordance with various embodiments of the present disclosure. At block 184, given a set of communication nodes S and beacon nodes B, a subset of communication nodes S'∈ S may be identified such that one or more communication nodes in S' have probabilities of lower location discovery error. For example, the subset S' may be chosen such that one or more communication nodes in S' may include large number of proximally located (e.g., neighboring) beacon nodes, because large number of close beacon nodes or neighbors may result in more accurate location discovery, as would be discussed in more details herein later.

In various embodiments, at block 188, the location of one or more communication nodes in the subset S' may be estimated using one of the previously discussed location discovery methods. Locations of the communication nodes in S' may be estimated relatively more accurately compared to the situation when the nodes in set S may be considered.

In various embodiments, at block 192, one or more communication nodes in S', the location of which have already been determined, may serve the purpose of additional beacon nodes for estimating locations of one or more communication nodes (including those outside the subset S', but included in the set S), the locations of which may yet to be estimated.

In various embodiments, the partitioning method may be used iteratively. That is, for example, the location of a first communication node in S' may be first estimated. The first communication node may subsequently be used as a beacon node for estimating location of one or more other communication nodes in S' (or communication nodes outside S'), and so on.

Figure 5:
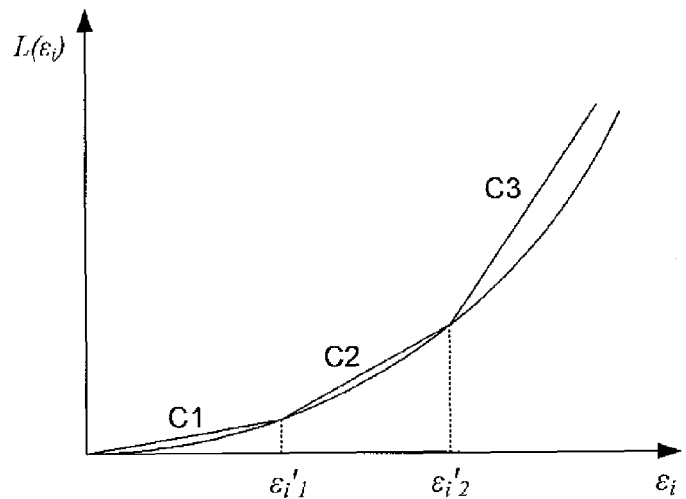
FIG. 5 illustrates an example convex curve of a location discovery error term.

In addition, once locations of one or more communication nodes may be estimated using method 180 of FIG. 7, the atomic multilateration method discussed with respect to FIG. 5 may be used to improve a single node's location discovery accuracy by taking into account, for example, the neighboring beacon nodes. In various embodiments, this fine-tuning technique may also be used iteratively depending on the desired location discovery accuracy. In various embodiments, the runtime and average error of a location discovery method may be reduced and/or location of a large number of communication nodes may be discovered more efficiently using the method of FIG. 7.

Location Discovery (LD) Error Model

As previously discussed, the estimation of distance between two nodes may have a probability of error, which may introduce error in the location discovery (e.g., the difference between the actual location and an estimated location) of a communication node.

The location discovery error may be based at least in part on a variety of factors. For example, the location discovery accuracy of a communication node may depend at least in part on the number of beacon nodes that are in close proximity, e.g., neighbor to the communication node. For example, for a higher number of proximally located beacon nodes, the average location discovery error may be lower.

Similarly, for a higher number of other proximally located communication nodes, the average location discovery error for a communication node may be lower, as the communication node may use estimated locations of other proximally located communication nodes to improve its own location discovery accuracy.

In various embodiments, for a lower average of distance measurement to three closest beacon nodes from a communication node, the average location discovery error for such a communication node may be lower. In various embodiments, for a higher total hop count to other nodes in the network from a given communication node, the average location discovery error for such a communication node may be higher.

Figure 8:
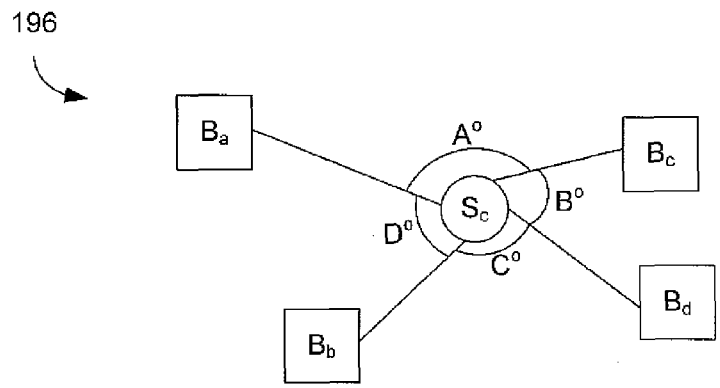
FIG. 8 illustrates an example wireless network.

In various embodiments, the average location discovery error of a communication node may also be based at least in part on the third largest angle of the neighboring nodes of the communication node. FIG. 8 illustrates an example wireless network 196 in accordance with various embodiments of the present disclosure. In the wireless network 196, the angles formed by the neighboring beacon nodes of the communication nodes Sc may be given by A°, B°, C°, and D°. As illustrated, angle C° is the third largest angle of the four angles, and for a larger the third largest angle, the average location discovery error of communication node Sc may be higher. In some examples, if a communication node has three neighboring beacon nodes, and if the third largest angle is 180° (e.g., if two of three neighboring beacon nodes are co-linear), then it may not be possible to uniquely locate the communication node.

In various embodiments, a location discovery (LD) error model may correlate the error in estimating the location of individual communication nodes with the distances of individual communication nodes with its nearest three neighboring beacon nodes. FIGS. 9a-9d illustrate example LD error models 200a-200d, respectively, all arranged in accordance with various embodiments of the present disclosure; and FIG. 10 illustrates an example method 240 for constructing the LD error models 200a-200d of FIGS. 9a-9d, all arranged in accordance with various embodiments of the present disclosure.

In various embodiments, LD error models 200a-200d may be constructed in a wireless network that may include a large number of communication and beacon nodes (e.g., about 100 or more communication nodes and beacon nodes). Furthermore, the LD error models 200a-200d may be constructed in an experimental environment where actual locations of the communication nodes, in addition to the beacon nodes, may be known in advance. In various embodiments, the LD error models may be constructed by one or more nodes in the network. Alternatively, in various embodiments, at least a part of the method 240 for constructing the LD error models 200a-200d may be carried out by one or more centralized computing devices (not illustrated in network 10 of FIG. 1) of a network, a user and/or an administrator of the network, or the like.

Figure 10:
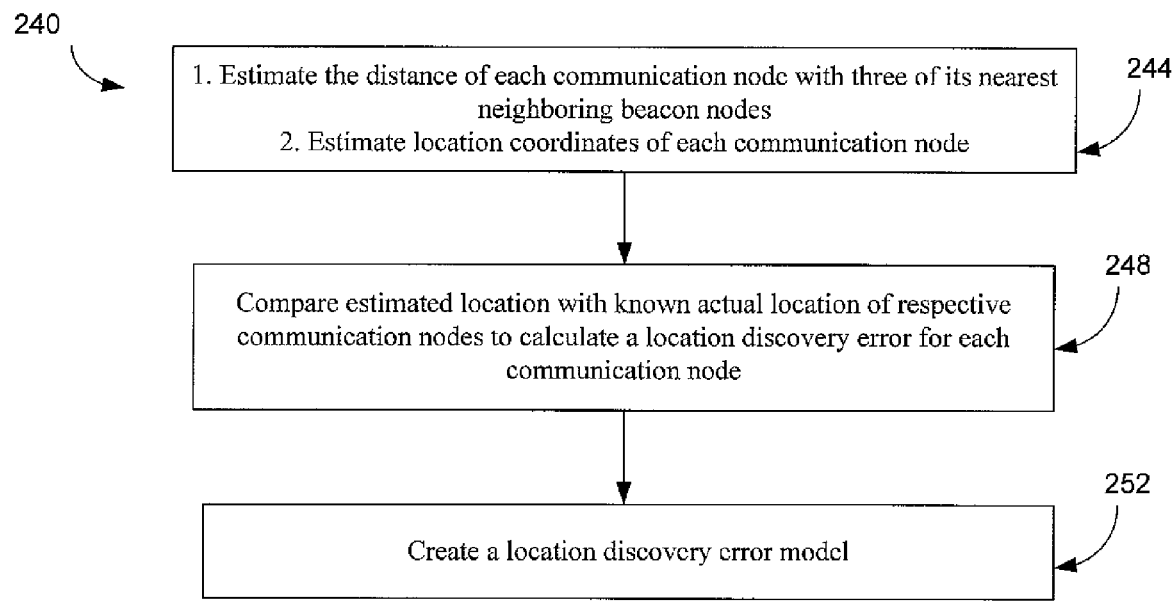
FIG. 10 illustrates an example method for constructing the LD error model of FIGS. 9a-9d.

Referring to the method 240 of FIG. 10, in various embodiments, at block 244, using one of the previously discussed methods, the distance of individual communication nodes with three of its nearest neighboring beacon nodes (indicated by three variables: "measurement to beacon 1", "measurement to beacon 2", and "measurement to beacon 3") may be estimated, along with an estimation of location coordinates of individual communication nodes. At block 248, the estimated location of individual communication nodes may be compared with known actual location of respective communication nodes to calculate a location discovery error for individual communication nodes. At block 252, the LD error models 200a-200d may be created using the location discovery error of individual communication nodes and the distance of the communication node with three of its neighboring neighbor nodes.

Figure 9A:
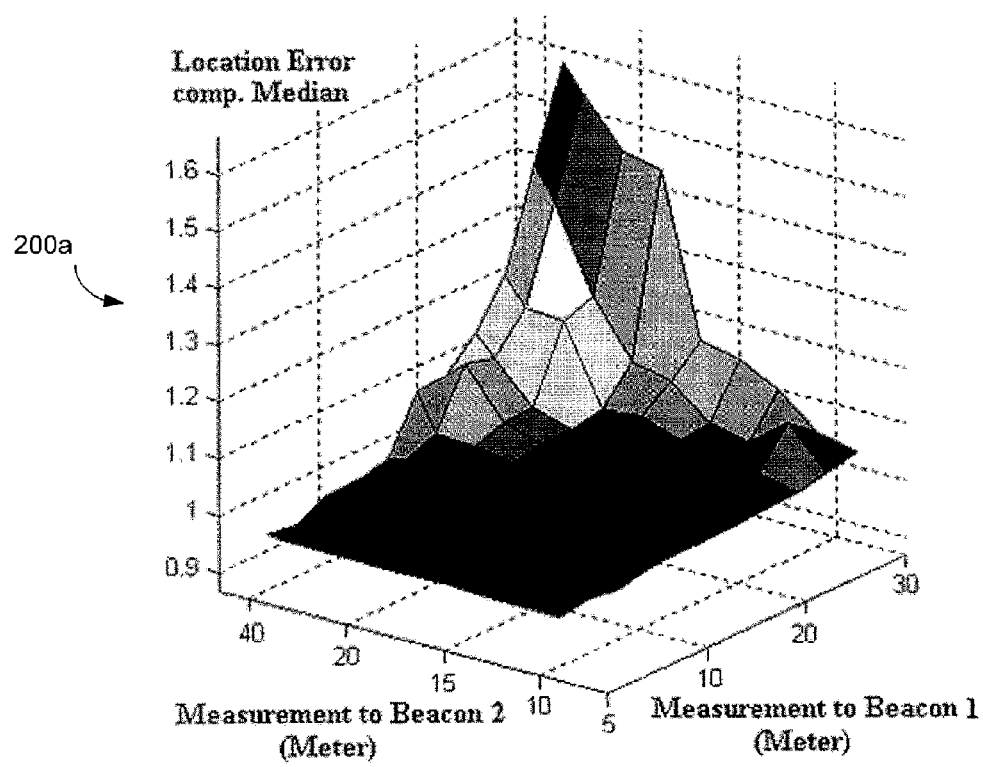
FIGS. 9a-9d illustrate an example location discovery (LD) error model.
Figure 9B:
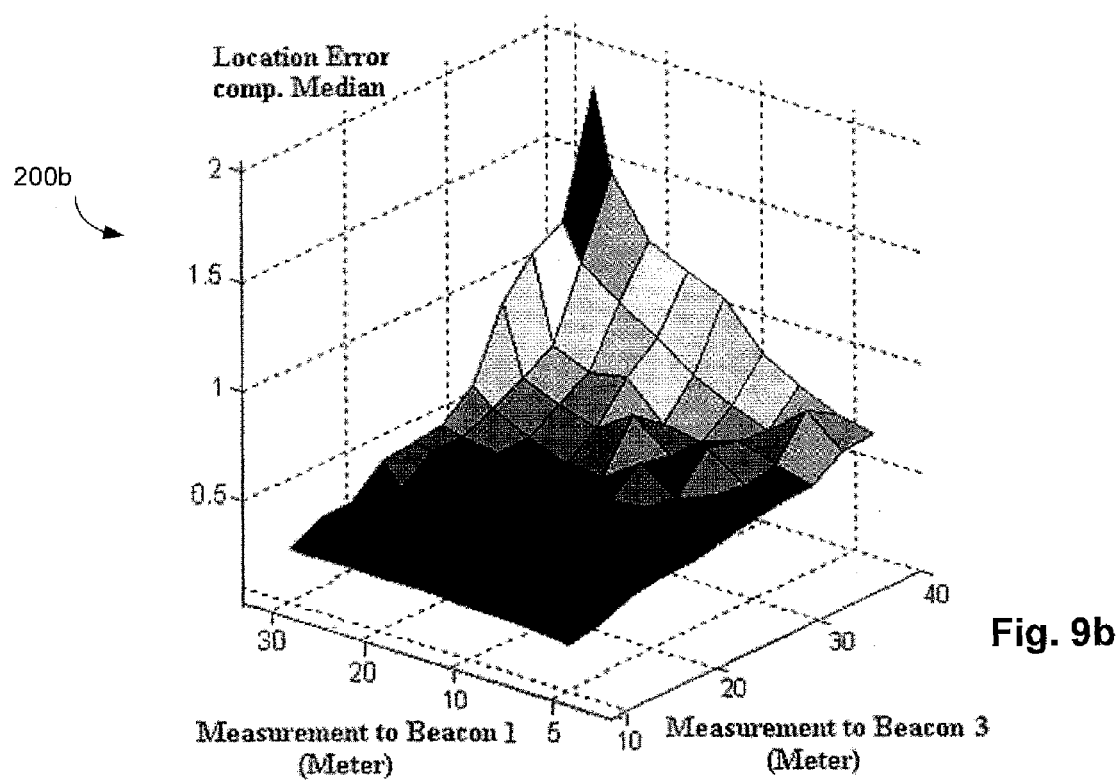
Figure 9C:
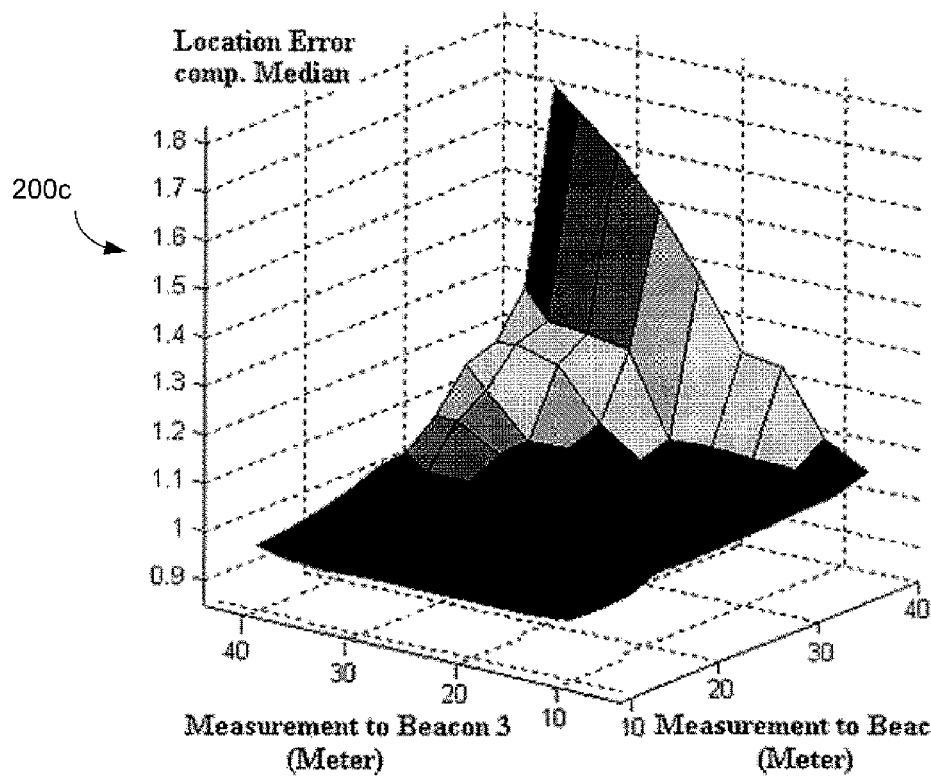

Referring to FIGS. 9a-9c, the three 3-D graphs may plot two of the three distance measurement variables ("measurement to beacon 1" variable, "measurement to beacon 2" variable, and "measurement to beacon 3" variable, with unit of measurement as meters) with the corresponding location discovery error (meters). For example, FIG. 9a plots the location discovery error with the variables "measurement to beacon 1" and "measurement to beacon 2". The graph in FIG. 9d is based at least in part on the graph in FIG. 9a, and the 2-D graph of FIG. 9d plots the location discovery error with the variable "measurement to beacon 1", for four different values of the variable "measurement to beacon 2".

Figure 9D:
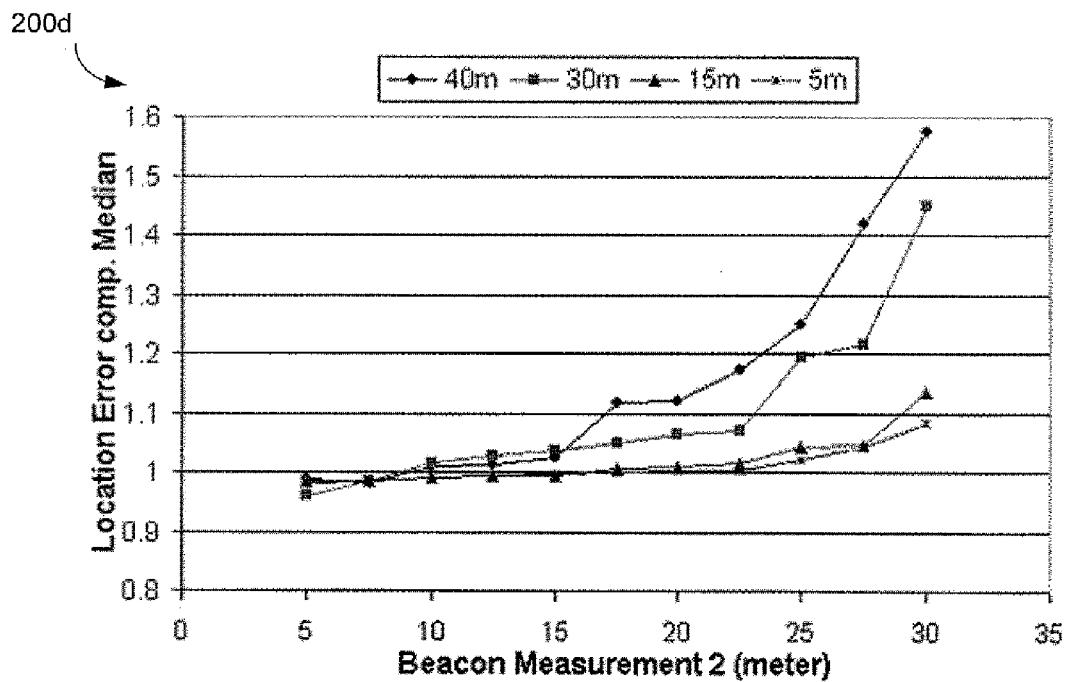

As may be observed from FIGS. 9a-9d, as individual measurements to beacon variable decreases, the corresponding location discovery error may also decrease, and as individual measurements to beacon variable increases, the corresponding location discovery error may also increase. That is, for a closer neighboring beacon node, the location discovery error may be lower. The LD error model may be approximated using monotonic piece-wise linear functions, as illustrated in FIG. 9d.

Although the LD error models associated with FIGS. 9 and 10 pertain to correlation between distances of a communication node with nearest three neighbors and the corresponding location discover error for the communication node, in various embodiments, other attributes of the communication nodes may be used for constructing a LD error model. For example, the LD error models may include correlation between a number of hops required to reach at least three neighboring beacon nodes of individual communication nodes and the error in location discovery of the corresponding communication node. In various embodiments, the LD error models may also include correlation between angles formed by a subset of neighboring beacon nodes of individual communication nodes and the error in location discovery of the corresponding communication node. In various embodiments, the LD error models may also include correlation between the number of neighboring beacon nodes for individual communication nodes and the error in location discovery of the corresponding communication node. In various embodiments, the LD error models may also include correlation between the number of neighboring beacon and communication nodes for individual communication nodes and the error in location discovery of the corresponding communication node.

The LD error models may have a variety of applications. For example, if the measured distances between any communication node and at least three neighboring beacon nodes are known, an expected value of a location discovery error for such a communication node may be determined from the LD error model. In other examples, the model may be used to determine desired locations for addition of one or more new beacon nodes, as discussed in more detail below.

Distance Calculation Error Model

Figure 11:
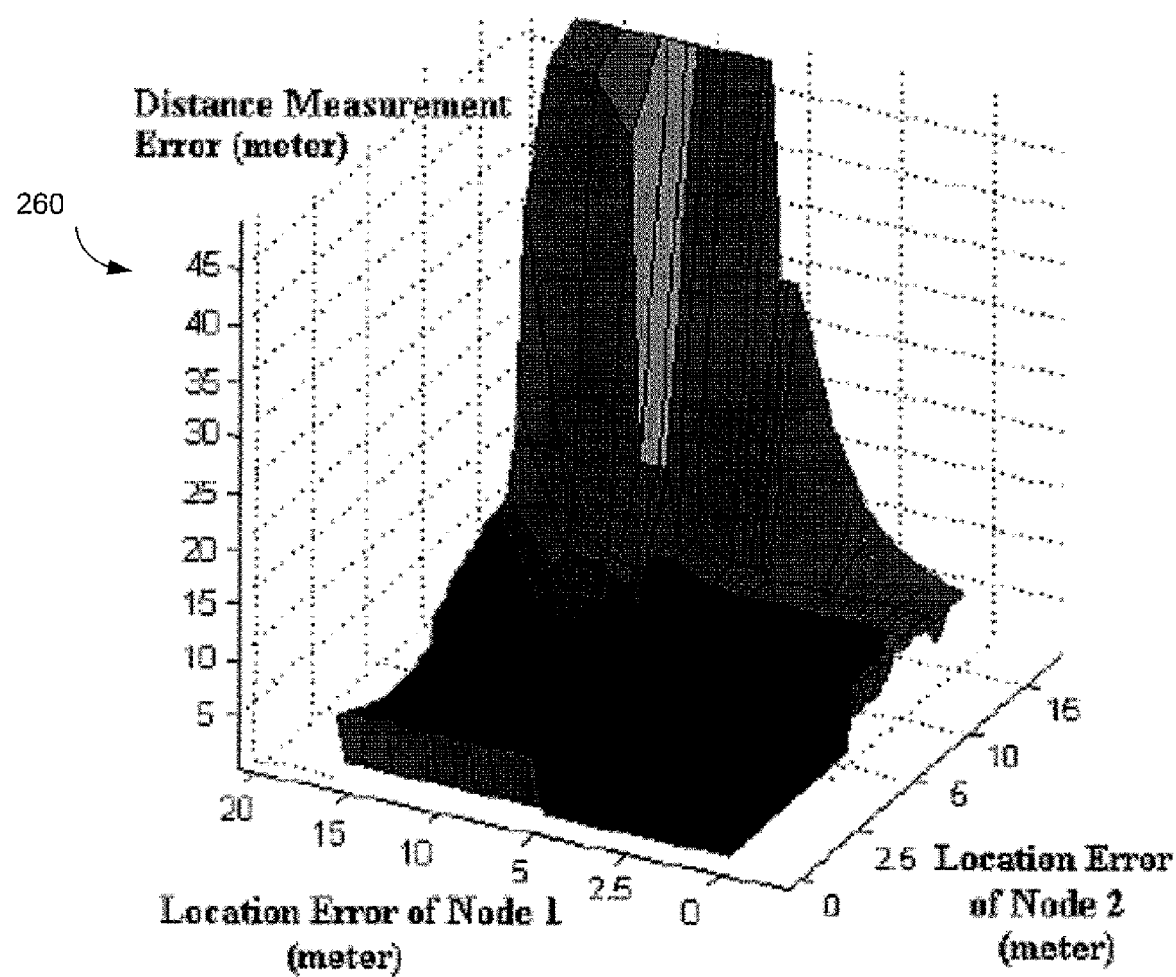
FIG. 11 illustrates an example distance calculation error model.

As discussed, low error in estimation of distances between nodes may be useful for a low error in estimating locations of one or more nodes. In various embodiments, it may be possible to correlate the location discovery error of two nodes with a distance measurement error between the two nodes, and a distance calculation error model may be created. FIG. 11 illustrates a distance calculation error model 260, in accordance with various embodiments of the present disclosure. The distance calculation error model 260 may include location error of two nodes (meters) in X and Y axes, and a distance measurement error (meters) in the Z axis. The location error of the nodes may be derived from the previously discussed LD error model, and the distance measurement error may be derived from the distance measurement error model 70. As observed from FIG. 11, a lower location error of any one or both the nodes may be related to a lower distance measurement error.

Node Addition

As previously discussed, the location discovery of a communication node may be based at least in part on the number of beacon nodes that may be in a relatively close proximity to the communication node. For example, for a higher number of proximally located beacon nodes, the average location discovery error may be lower. Accordingly, in various embodiments, placing new beacon nodes in addition to the existing nodes in a wireless network may permit more accurate location discovery of one or more communication nodes in the network.

In various embodiments, new beacon nodes may be placed randomly in a network. Alternatively, in various embodiments, new beacon nodes may be strategically placed in a network to improve the location discovery accuracy of one or more communication nodes. In various embodiments, one or more newly placed communication nodes may aid in improvement in location discovery accuracy of other communication nodes. For example, a new communication node that may be strategically placed may first identify its own location (from one or more neighboring beacon nodes), and may subsequently act as a beacon node and that may help other communication nodes to identify their respective locations relatively more accurately.

Adding a Single Node at a Time

Figure 12:
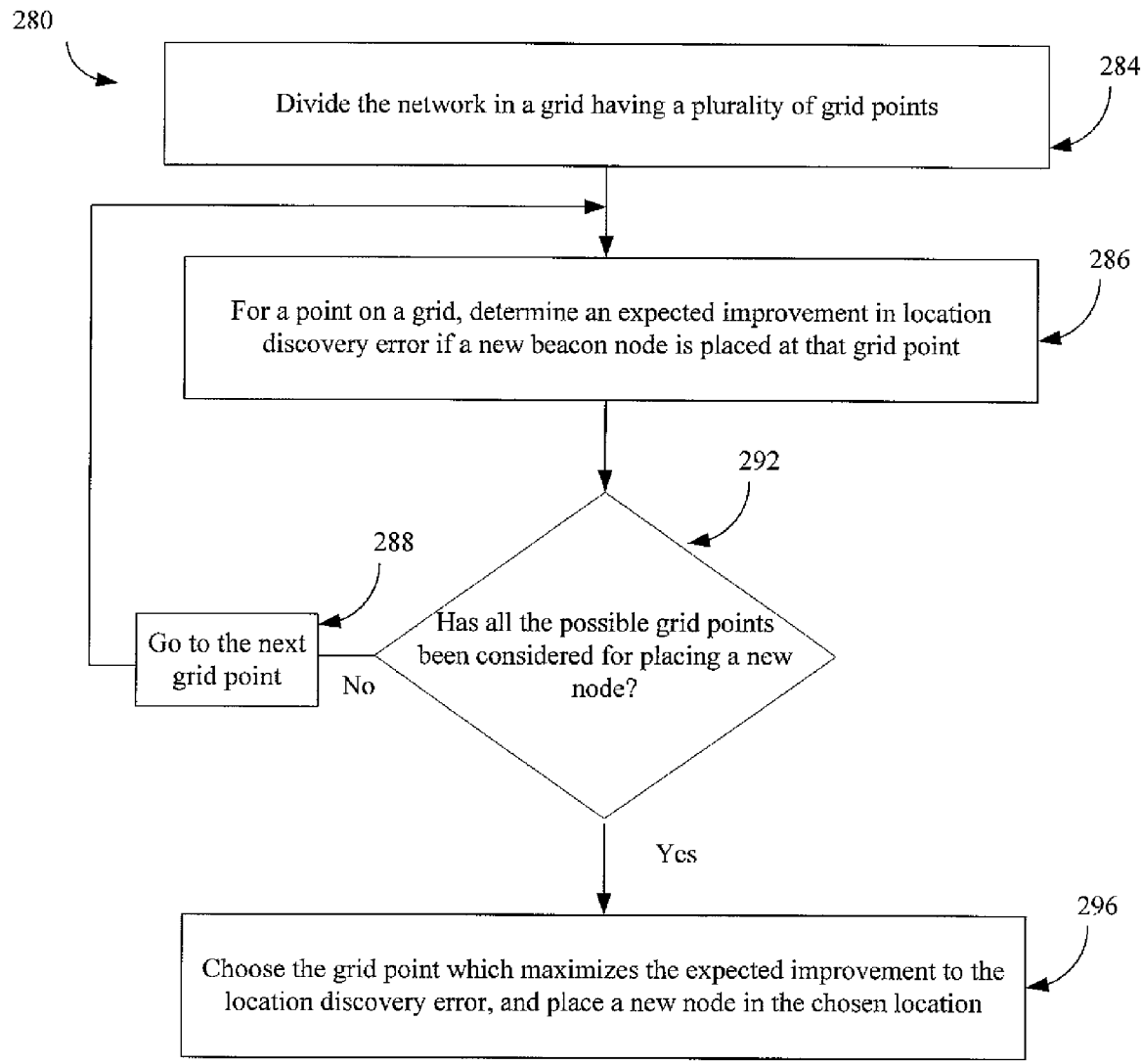
FIG. 12 illustrates an example method for adding a new node to a wireless network to improve location discovery accuracy.

FIG. 12 illustrates an example method 280 for adding a new node to a wireless network to improve location discovery accuracy, in accordance with various embodiments of the present disclosure. In various embodiments, a single beacon node or a communication node may be substantially optimally placed in the network according to method 280, and the process may be repeated for individual new nodes that may be desirable to be placed in the network.

Referring to FIG. 12, in various embodiments, at block 284, the network may be divided in grid, having a plurality of grid points. At block 286, for any point (x, y) on the grid, an expected improvement in location discovery error for the communication nodes, by placing a new node at point (x, y), may be determined.

For example, an expected location discovery error for communication node Si, without any placing any new node at (x, y), may be given by $E(e_i)$; whereas an expected location discovery error for communication node Si, with a new beacon node placed at location (x, y), may be given by $E(e_i')$. And the expected improvement in location discovery for node Si may be given by ($|E(e_i)|-|E(e_i')|$).

Accordingly, the total expected improvement in location discovery for the communication nodes, by placing a new beacon node in location (x, y), may be given by $$E_{(x,y)} = \sum_{i=1}^{Ns} ((|E(e_i)| - |E(e_i')|)),$$

where there may be $N_s$ number of communication nodes in the network.

In various embodiments, the expected location discovery errors of individual communication nodes, with and without the new beacon node placed at a grid point (x, y) (e.g., $E(e_i)$ and $E(e_i')$, respectively, for node Si) may be estimated from the previously discussed LD error model. For example, assume that the communication node Si has two nearest neighboring beacon nodes at distances 25 m and 30 m originally. Referring to FIG. 9d (and/or FIG. 9a), the expected error in location discovery may be approximately 1.195 m (e.g., $E(e_i)$) with respect to the median location error, without addition of the new node. Let a new beacon node be placed at a known location (x, y) such that one of node Si's nearest beacon measurements decrease from 30 m to 15 m. With the new beacon node placed at (x, y), the nearest two beacon nodes from node Si may be at distances 25 m and 15 m. Referring again to FIG. 9d, a combination of beacon measurements 25 m and 15 m may have an expected location error (e.g., $E(e_i')$) of approximately 1.042 m when normalized to the median location error of the network. Thus, for communication node Si, the expected improvement in location discovery error (e.g., $|E(e_i)|-|E(e_i')|$) may be 0.153 m. The process may be repeated for one or more other communication nodes to determine the total expected improvement in location discovery by placing the new beacon node in location (x, y).

Referring again to FIG. 12, the method 280 may include, at block 292, checking if the grid locations have been considered for placing a new node. If not, at block 288, a next grid point (e.g., (x1, y1)) may be considered for placing a new node, and the process may be repeated until all or a portion of all grid points for possible placement of a new node may be been considered. In various embodiments, those grid points that are empty (e.g., don't already have a communication node or a beacon node) may be considered for placement of a new beacon node. At block 296, of the grid points considered so far, the grid point that may maximizes or at least increases the expected improvement to the location discovery error may be chosen and a new node may be placed in the chosen location.

Although not illustrated in FIG. 12, in various embodiments, the method 280 may be repeated for adding subsequent new beacon nodes to the network.

Thus, using the LD error model and through method 280, locations may be determined such that placing additional nodes would reduce the average location discovery error the location discovery error improvement once additional nodes are placed may be predicted.

Adding Multiple Nodes Simultaneously

Figure 13:
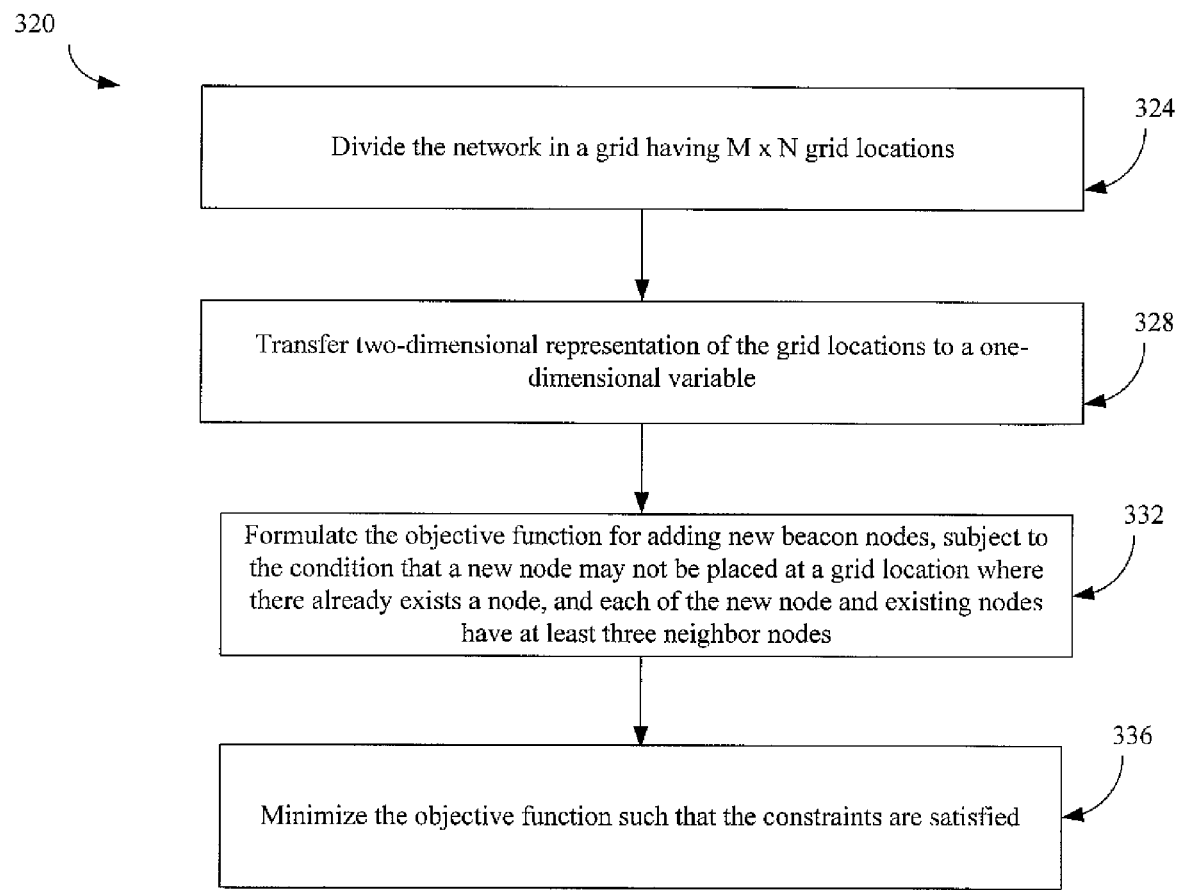
FIG. 13 illustrates an example method for simultaneously adding a plurality of beacon nodes to a wireless network.

In various embodiments, a plurality of beacon nodes may be added simultaneously to improve the location discovery accuracy. FIG. 13 illustrates an example method 320 for simultaneously adding a plurality of beacon nodes to a wireless network, in accordance with various embodiments of the present disclosure. In various embodiments, the method 320 may include, at block 324, dividing the network in a grid having M×N number of grid locations, where individual grid locations are represented as (m, n), with m=1, . . . , M and n=1, ..., N. In various embodiments, at block 328, the two dimensional representation of a grid location (m, n) may be transferred to a single variable i, where i=n·N+m.

In various embodiments, $S'_i$ may denote whether a node already exists at grid location i; and $E_{ij}$ may denote whether nodes located at grid locations i and j are neighbors. In various embodiments, if a new node is placed at grid location i, a constant $NE_{ij}$ may denote whether the newly added node at grid location i is a neighbor of the node located at grid location j; and gi may denote if location i is selected for possible placement of new nodes. Thus, $$S'_i = \begin{cases} 1, & \text{if there is a node located at grid } i \text{ before adding} \\ 0, & \text{otherwise,} \end{cases}$$

$$E_{ij} = \begin{cases} 1, & \text{if nodes located at grids } i \text{ and } j \text{ are neighbors} \\ 0, & \text{otherwise,} \end{cases}$$

$$g_i = \begin{cases} 1, & \text{if grid } i \text{ is selected for new node addition} \\ 0, & \text{otherwise} \end{cases}, \text{ and}$$

$$NE_{ij} = \begin{cases} 1, & \text{if new node placed at grid } i \text{ is neighbor with} \\ & \text{with node located at grid } j \\ 0, & \text{otherwise.} \end{cases}$$

In various embodiments, an objective function may minimize the number of additional nodes added, e.g., the summation of gi, i=1, ..., M·N. The minimization of the objective function may be achieved in view of different constraints. In various embodiments, the problem of adding a plurality of nodes may be expressed as:

$$OF: \min \sum_{i=1}^{M \cdot N} g_i$$

Such that (s.t):

$$\sum_{i=1}^{M \cdot N} g_i \cdot S'_i = 0 \quad \quad 1)$$

$$\sum_{i=1}^{M \cdot N} (E_{ij} + g_i \cdot NE_{ij}) S'_j \geq 3S'_j, \quad j = 1, \ldots, M \cdot N \quad 2)$$

$$\sum_{\substack{j=1 \\ j \neq i}}^{M \cdot N} (E_{ij} + g_i \cdot NE_{ij}) S'_j \geq 3g_i, \quad i = 1, \ldots, M \cdot N \quad 3)$$

Thus, in various embodiments, at block 332, the objective function may be used to minimize the number of newly added nodes such that a plurality of constraints may be satisfied. For example, the first constraint may ensure that a new node may not be placed in the grid location of an existing node. The other two constraints may ensure that individual newly added nodes and existing nodes may have at least three neighboring nodes (including existing nodes and/or new nodes). Solving the above equations may yield the minimum number of newly added nodes as well as their locations, such that individual newly added and existing nodes may have at least three neighboring nodes.

In various embodiments, at block 336, the above OF may be minimized to determine the number and location of the new nodes, in view of the constraints, using a number of computational techniques, such as, integer linear programming.

LD Infrastructure Engineering Change

In various embodiments, one or more beacon nodes may form a location discovery infrastructure (LDI), which may aid in determining locations of one or more communication nodes in a network. To be more specific, an LDI may include a relatively small number of beacon nodes that may permit any arbitrary node in the network to promptly and accurately locate itself In various embodiments, the LDI problem may include determining where to place one or more beacon nodes, how to group the beacon nodes that may simultaneously transmit LD information (e.g., acoustic signals) to other nodes, the periodic order in which individual groups may transmit LD information to other nodes, etc.

In various embodiments, as previously discussed, with an increase in the number of beacon nodes, the location discovery error may decrease. However, after a threshold number of beacon nodes may be placed in a network, the improvement in the location discovery error may not be substantial. Additionally, the new beacon nodes may increase overhead (e.g., financial and computation cost).

In various embodiments, an LDI engineering change task may include determining a desired or a substantially optimal number of beacon nodes that may be added to a wireless network such that an increase in the location discovery accuracy, along with an increase in overhead of the newly added beacon nodes may both be taken into account. For example, a wireless network may be initially populated with $N_B$ number of beacon nodes, and a number of beacon nodes to be added to the network to minimize an objective function may be determined. For example, any of 0, 1, ..., $N_L$ number of beacon nodes may be added to the network such that there are between $N_B$ and $(N_B+N_L)$ number of beacon nodes in the network. In various embodiments, any subset of $N_B$+i beacon nodes, i=0, ..., $N_L$, may form a high quality LDI. In other words, in various embodiments, it may be desirable to enable $N_B$, $N_B$+1, $N_B$+2, ..., $N_B$+$N_L$−1, NB+$N_L$ beacon nodes to have comparable location discovery errors.

Thus, in various embodiments, $N_B$ number of initial beacon nodes may be placed in a network, and their locations may be fixed. Subsequently, up to $N_L$ number of new beacon nodes may be added to the network. For all $N_L$+1 cases, there may be a competitive LDI solution against the scenario where NB+i beacon nodes, i=0, ..., NL, may be placed without the restriction to keep the initial NB beacon nodes fixed. The problem of determining a desired number of beacon nodes may be formulated with the following objective function:

$$OF: \min F(G(E_i(\epsilon)), H(f(i))), \text{ for } i=0, \ldots, N_L,$$

where $E_i(\epsilon)$ may represent the total expected location discovery error (e.g., sum of the expected location discovery errors of all communication nodes, with i number of new beacon nodes placed in the network), i=1, ..., NL, and may be determined using methods discussed previously. For example, when i=1, e.g., with a single added beacon node, the total expected location discovery error may be determined using discussions pertaining to block 286 of method 280 in FIG. 12. In various embodiments, various other factors may also be taken into account while solving the above problem. For example, with an increase in the number of new beacon nodes, the overhead cost may also increase, which may be denoted by the term f(i) in the objective function. The term f(i) may include, for example, computation and financial overhead increases with a corresponding increase in the new beacon nodes, and may monotonically increase with the number of new nodes i. In various embodiments, F(.), G(.), and H(.) may be appropriate linear or non-linear functions that model and weight various terms in the objective function. The objective function may be solved, for example, using a constraint manipulation strategy and/or integer linear programming or other computational techniques.

In various embodiments, another LDI engineering change task may include, after initial placement of $N_B$ number of beacon nodes, moving up to $N_M$ (from the initially placed $N_B$) number of beacon nodes and/or adding up to an additional $N_L$ number of new beacon nodes so that the LDI structure may permit increased location discovery accuracy. An objective function, similar to that discussed above, may be considered and solved using a constraint manipulation strategy, integer linear programming, and/or other computational techniques.

Computing System

Figure 14:
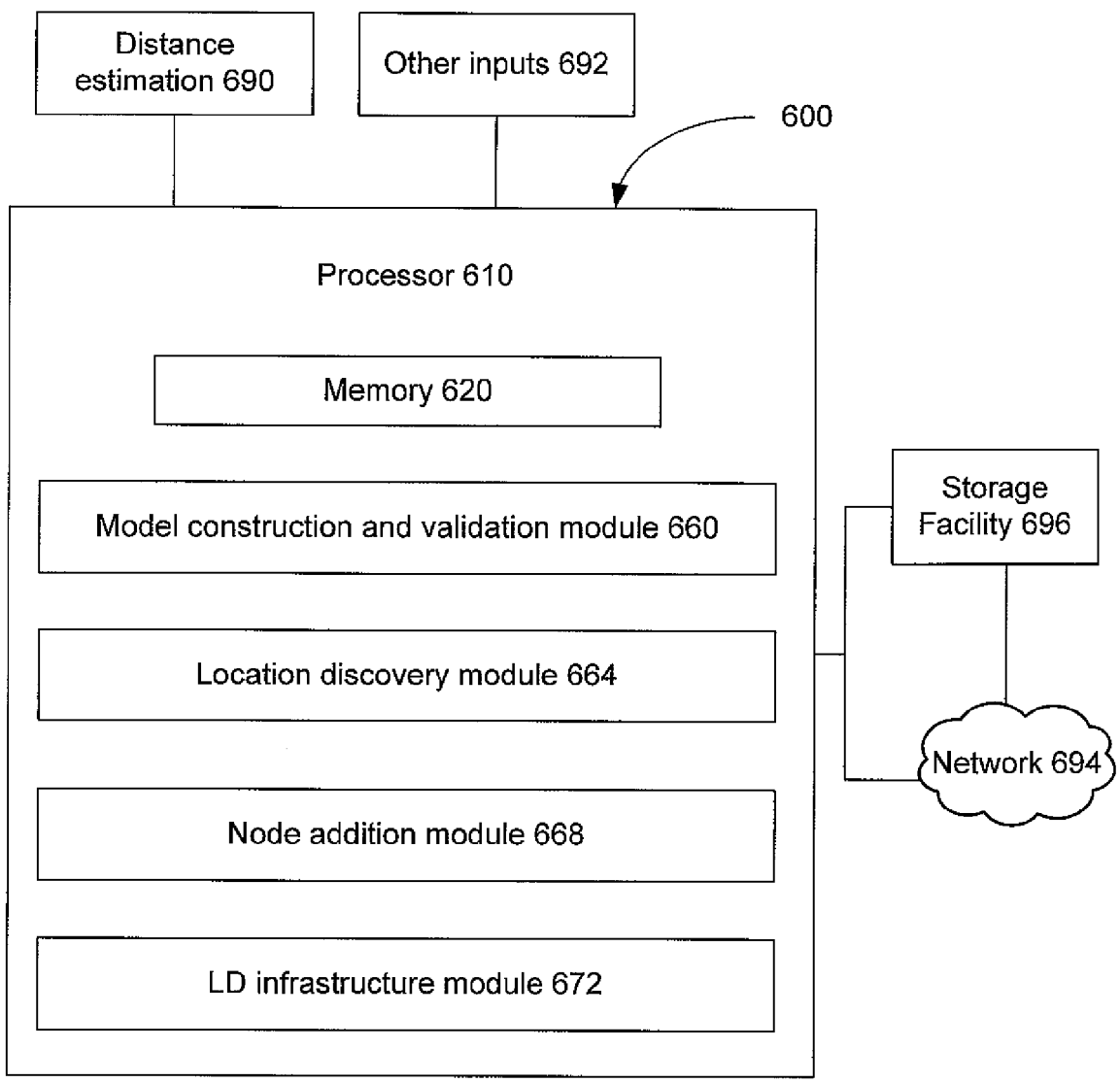
FIG. 14 illustrates an example computing system that may be suitable for practicing various embodiments.
Figure 2:
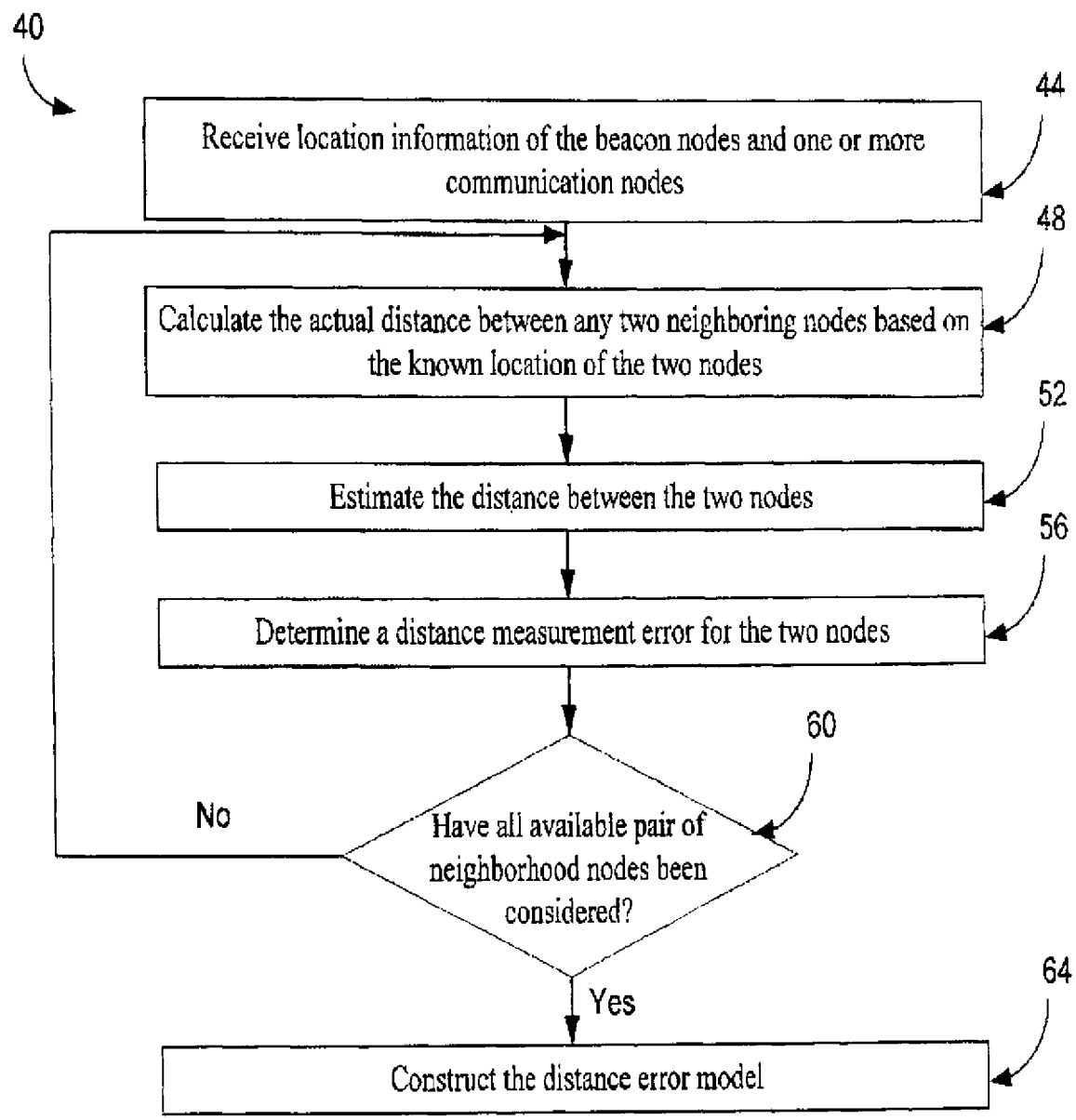

FIG. 14 illustrates an example computing system 600 that may be suitable for practicing various embodiments of the present disclosure. Computing system 600 may comprise processor 610 and memory 620. In various embodiments, the computing system 600 may receive distance estimation 690 from one or more nodes. For example, a first node (not illustrated in FIG. 14) may be configured to receive signals from a second node, to estimate the distance between the first and the second node, and to input the distance estimation 690 to the computing system 690. In various embodiments, instead of (or in addition to) receiving the distance estimation 690, the computing system 600 may receive the signals received by the first node (e.g., from the second node) and estimate the distance between the first node and the second node. In various embodiments, the computing system 600 may also receive other inputs 692, e.g., input from a user.

Computing system 600 may also include one or more data models and/or computation modules configured to practice one or more aspects of this disclosure. For example, the computing system 600 may include model construction and validation module 660 that may be used, in various embodiments, to construct and/or validate one or more models (e.g., LD error model, distance error model, mobility model, environmental model, distance calculation error model, etc.) previously disclosed in this disclosure. In various embodiments, the computing system 600 may also include a location discovery module 664 to discover locations of one or more communication nodes in a network. In various embodiments, the computing system 600 may also include a node addition module 668 to add one or more nodes serially and/or a plurality of nodes simultaneously in a network. In various embodiments, the computing system 600 may also include an LD infrastructure module 672 to develop or change an LD infrastructure of a network.

In various embodiments, the computing system 600 may be operatively coupled to a network 694. Although not illustrated in FIG. 14, in various embodiments, the computing system 600 may be a part of the network 694. The computing system 696 may also be coupled to an external storage facility 696 for storing data. In various embodiments, processor 610 may be a general-purpose processor and memory 620 may be a hard drive, solid-state drive, Random Access Memory (RAM), or other appropriate type of memory. In various embodiments, a plurality of programming instructions may be stored within memory 620 or other memory and configured to program processor 610 to function as described within this disclosure. In various embodiments, processor 610 may be an Application-specific Integrated Circuit (ASIC), a field-programmable gate array (FPGA), or other logic device having specific functions built or programmed directly into it.

In various embodiments, one or more modules (but not all) may be present in the computing system 600. In various embodiments, the computing system 600 may be included in a communication node of a network. In such embodiments, the computing system 600 may utilize the location discovery module 664 to discover a location of the communication node. In various embodiments, the computing system 600 may be included in a centralized computing device (not illustrated in FIG. 1) of a network or may be controlled by a user and/or an administrator of the network, and may utilize the model construction and validation module 660 to construct and/or validate one or more models, utilize the node addition module 668 to add one or more nodes to the network, and/or utilize the LD infrastructure module 672 to develop or change an LD infrastructure of a network.

Although not illustrated in FIG. 14, the computing system 600 may include one or more components known to those skilled in the art. For example, the computing system 600 may include one or more appropriate drives, storage media, user input devices through which a user may enter commands and data (e.g., an electronic digitizer, a microphone, a keyboard and pointing device, commonly referred to as a mouse, trackball, touch pad, joystick, game pad, satellite dish, scanner, or the like), one or more interfaces (e.g., a parallel port, game port, a universal serial bus (USB) interface), etc. and may be coupled to one or more peripherals (e.g., a speaker, a printer, etc.). The computer system 600 may operate in a networked environment (e.g., wide area networks (WAN), local area networks (LAN), intranets, the Internet, etc.) using logical connections to one or more computers, such as a remote computer (e.g., a personal computer, a server, a router, a network PC, a peer device or other common network node, etc.) connected to a network interface.

FIG. 15 illustrates an example computing program product 701 in accordance with various embodiments. In various embodiments, computing program product 701 may comprise a signal bearing medium 703 having programming instructions stored therein. The computing signal bearing medium 703 may be, for example, a compact disk (CD), a digital versatile disk (DVD), a solid-state drive, a hard drive, or other appropriate type of data/instruction storage medium. The computing programming product 701 may be, for example, included in or employed to program or configure a communication node, a beacon node, and/or in a peer or centralized device in a network. Embodiments are not limited to any type or types of computing program products.

Signal bearing medium 703 may contain one or more instructions 705 configured to practice one or more aspects of the disclosure. Embodiments may have some or all of the instructions depicted in FIG. 15. Embodiments of computing program product 701 may have other instructions in accordance with embodiments described within this specification. In various embodiments, the one or more instructions 705 may include instructions to implement a model comprising a plurality of monotonic piece-wise linear functions, to permit an apparatus to model distance measurement error between a communication node and a beacon node. Thus, the one or more instructions 705 may include instructions to implement the previously discussed distance measurement error model 70. In various embodiments, the one or more instructions 705 may include instructions to implement a plurality of piece-wise linear functions to permit an apparatus to model location discovery error for one or more communication nodes. In various embodiments, the one or more instructions 705 may include instructions to implement the previously discussed distance calculation error model 260 based at least in part on modeled location errors at two points. In various embodiments, the one or more instructions 705 may include instructions to implement the previously discussed scalable indoor or outdoor model. In various embodiments, the one or more instructions 705 may include instructions to implement previously discussed individual mobility model. In various embodiments, the one or more instructions 705 may include instructions to determine a location of one or more communication nodes in a network, as discussed in more details earlier in this disclosure. In various embodiments, the one or more instructions 705 may include instructions to serially add one or more nodes to a network and/or simultaneously add a plurality of new nodes to a network. In various embodiments, the one or more instructions 705 may include instructions to determine a location discovery infrastructure for a network, as previously discussed.

In various embodiments, the signal bearing medium 703 may include a computer readable medium 707, including but not limited to a CD, a DVD, a solid-state drive, a hard drive, computer disks, flash memory, or other appropriate type of computer readable medium. In various embodiments, the signal bearing medium 703 may also include a recordable medium 709, including but not limited to a floppy disk, a hard drive, a CD, a DVD, a digital tape, a computer memory, a flash memory, or other appropriate type of computer recordable medium. In various embodiments, the signal bearing medium 703 may include a communications medium 711, including but not limited to a fiber optic cable, a waveguide, a wired or wireless communications link, etc.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that individual function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically matable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for determining respective locations of a plurality of communication devices, comprising:

formulating, by a computing device, the determining of the respective locations as a quantitative problem based at least in part on estimated distances between individual communication devices and neighboring beacon nodes whose locations are known, wherein the quantitative problem is expressed in terms of a non-linear objective function, wherein the non-linear objective function is to minimize a total amount of error according to a location discovery error model; and solving, by the computing device, the quantitative problem to determine the respective locations of the plurality of communication devices, wherein the solving includes solving a linearized approximation of the non-linear objective function;

wherein the non-linear objective function is

OF: $\min M(\epsilon_i)$, wherein $\epsilon_i = \sqrt{(X_{Bi}-X_s)^2+(Y_{Bi}-Y_s)^2} - d_{is}$, wherein $X_{Bi}, Y_{Bi}$ are X and Y coordinates of beacon node Bi, $X_s$, $Y_s$ are X and Y coordinates of communication node s, $D_{is}$ is the estimated distance between the beacon node Bi and the communication node s, $\epsilon_i$ is an amount of error between the estimated distance and a measured distance between a communication node and the $i^{th}$ beacon node, and $M(\epsilon_i)$ is an expected location discovery error according to the location discovery error model;

wherein the solving comprises:

solving a piece-wise linear approximation of the non-linear objective function, by solving $$OF: \min \underset{i=1,\ldots,N}{L}(\varepsilon_i)$$

such that $C_i \varepsilon_i + C_j \varepsilon_j = C_{ij} + B_x X_S + B_y Y_S$ for all $\begin{cases} i = 1, \ldots, N_B \\ j = 1, \ldots, N_B \\ i \neq j \end{cases}$ wherein L is the piece-wise linear approximation applied on the measurement error, $C_i$, $C_j$, and $C_{ij}$ are constants, $B_x = (X_{Bj} - X_{Bi})$, $B_y = (Y_{Bj} - Y_{Bi})$, and $N_B$ is the number of beacon nodes.

2. The method of claim 1, wherein the formulating comprises:

formulating the determining of the respective locations based at least in part on the estimated distances between the individual communication devices and at least three non-collinear neighboring beacon nodes whose locations are known.

3. The method of claim 1, wherein the formulating and the solving are performed for one communication device at a time.

4. The method of claim 1, wherein the formulating and the solving are performed for a plurality of communication devices simultaneously, employing non-linear programming and a one-dimensional search.

5. The method of claim 1, wherein the formulating comprises:

identifying a subset of the plurality of communication devices and the neighboring beacon nodes such that communication device or devices in the subset have probabilities of relatively lower location discovery error as compared to communication device or devices that are not in the subset; and formulating the determining of the respective locations, based at least in part on estimated distances between the communication device or devices in the identified subset and the neighboring beacon nodes in the identified subset.

6. An apparatus, comprising:

means for formulating a determination of locations of a plurality of communication devices as a quantitative problem based at least in part on estimated distances between individual communication devices and neighboring beacon nodes whose locations are known, wherein the quantitative problem is expressed in terms of a non-linear objective function, wherein the non-linear objective function is to minimize a total amount of error according to a location discovery error model; and means for solving the quantitative problem to determine the locations of the plurality of communication devices, wherein the solving includes solving a linearized approximation of the non-linear objective function;

means for formulating comprises means for formulating the non-linear objective function as:

$OF : \min M(\epsilon_i)$, wherein $\epsilon_i = \sqrt{(X_{Bi} - X_s)^2 + (Y_{Bi} - Y_s)^2} - d_{is}$ wherein $X_{Bi}$, $Y_{Bi}$ are X and Y coordinates of beacon node Bi, $X_s$, $Y_s$ are X and Y coordinates of communication node s, $d_{is}$ is the estimated distance between the beacon node Bi and the communication node s, $\epsilon_i$ is an amount of error between the estimated distance and a measured distance between a communication node and the $i^{th}$ beacon node, and $M(\epsilon_i)$ is an expected location discovery error according to the location discovery error model; and the means for solving comprises means for solving a piece-wise linear approximation of the non-linear objective function, by solving $$OF: \min \underset{i=1,\ldots,N}{L}(\varepsilon_i)$$

such that $C_i \varepsilon_i + C_j \varepsilon_j = C_{ij} + B_x X_S + B_y Y_S$ for all $\begin{cases} i = 1, \ldots, N_B \\ j = 1, \ldots, N_B \\ i \neq j \end{cases}$ wherein L is the piece-wise linear approximation applied on the measurement error, $C_i$, $C_j$, and $C_{ij}$ are constants, $B_x = (X_{Bj} - X_{Bi})_2$ $B_y = (Y_{Bj} - Y_{Bi})$, and $N_B$ is the number of beacon nodes.

* * * * *

UNITED STATES PATENT AND TRADEMARK OFFICE
CERTIFICATE OF CORRECTION

PATENT NO. : 8,369,242 B2
APPLICATION NO. : 12/415518
DATED : February 5, 2013
INVENTOR(S) : Potkonjak It is certified that error appears in the above-identified patent and that said Letters Patent is hereby corrected as shown below:

On Title Page 2, item (56), under "OTHER PUBLICATIONS", in Column 1, Line 11 delete "Hetworks" and insert -- Networks --, therefor.

In the Drawings:
In Fig. 2, Sheet 2 of 14, for Tag "60", adjust the text in the box as shown on attached sheet.

In the Specification:
In Column 3, Line 5, delete "(IEEE)" and insert -- (IEEEs) --, therefor.

In Column 8, Line 60, delete " $\epsilon_i = \sqrt{(X_{Bi}-X_s)^2+(Y_{Bi}-Y_s)^2} d_{is}$ " and insert -- $\varepsilon_i = \sqrt{(X_{Bi} - X_s)^2 + (Y_{Bi} - Y_s)^2} - d_{is}$ --, therefor.

In Column 9, Line 9, delete " $\epsilon_i = \sqrt{(X_{Bi}-X_x)^2+(Y_{Bi}-Y_s)^2} - d_{is}$ " and insert -- $\varepsilon_i = \sqrt{(X_{Bi} - X_s)^2 + (Y_{Bi} - Y_s)^2} - d_{is}$ --, therefor.

In Column 11, Line 34, delete "(NPL)" and insert -- (NLP) --, therefor.

In Column 18, Line 13, delete "itself" and insert -- itself. --, therefor.

In Column 20, Line 31, delete "(WAN)," and insert -- (WANs), --, therefor.

In Column 20, Line 32, delete "(LAN)," and insert -- (LANs), --, therefor.

Signed and Sealed this
Twenty-fifth Day of February, 2014

Michelle K. Lee
*Deputy Director of the United States Patent and Trademark Office*

In Column 23, Lines 48-49, delete "matable" and insert -- mateable --, therefor.

In the Claims:
In Column 25, Line 3, in Claim 1, delete "$D_{is}$" and insert -- $d_{is}$ --, therefor.

In Column 25, Line 27, in Claim 19, delete "$B_x = (X_{Bj} - X_{Bi}),$" and insert -- $B_x = (X_{Bj} - X_{Bi})2$ --, therefor.